(12) United States Patent
Parks

(10) Patent No.: US 7,379,107 B2
(45) Date of Patent: May 27, 2008

(54) IMAGE SENSOR FOR STILL OR VIDEO PHOTOGRAPHY

(75) Inventor: Christopher Parks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 600 days.

(21) Appl. No.: 11/009,566

(22) Filed: Dec. 10, 2004

(65) Prior Publication Data

US 2006/0125943 A1 Jun. 15, 2006

(51) Int. Cl.
*H04N 3/14* (2006.01)
*H04N 9/04* (2006.01)

(52) U.S. Cl. .................. 348/294; 348/282; 348/272

(58) Field of Classification Search .............. 348/294, 348/282
See application file for complete search history.

(56) References Cited

U.S. PATENT DOCUMENTS

| | | | | |
|---|---|---|---|---|
| 4,821,088 A * | 4/1989 | Tabei et al. | ............... | 348/280 |
| 5,668,597 A | 9/1997 | Parulski et al. | | |
| 5,828,406 A | 10/1998 | Parulski et al. | | |
| 6,342,921 B1 | 1/2002 | Yamaguchi et al. | | |
| 6,462,779 B1 | 10/2002 | Philbrick | | |
| 6,661,451 B1 | 12/2003 | Kijima et al. | | |
| 6,882,366 B1 * | 4/2005 | Kijima et al. | ............... | 348/294 |
| 6,930,716 B2 * | 8/2005 | Yoshida | ............... | 348/322 |
| 7,002,630 B1 * | 2/2006 | Iizuka | ............... | 348/322 |
| 7,199,826 B2 * | 4/2007 | Uya | ............... | 348/273 |
| 2001/0010554 A1 | 8/2001 | Yoshida | | |
| 2002/0089598 A1 * | 7/2002 | Ishimoto et al. | ............... | 348/311 |
| 2002/0135689 A1 | 9/2002 | Uya | | |
| 2003/0067550 A1 | 4/2003 | Inokuma et al. | | |
| 2005/0243195 A1 * | 11/2005 | Parks | ............... | 348/311 |
| 2006/0125943 A1 * | 6/2006 | Parks | ............... | 348/311 |

\* cited by examiner

*Primary Examiner*—Lin Ye
*Assistant Examiner*—Hung H. Lam
(74) *Attorney, Agent, or Firm*—Peyton Watkin

(57) ABSTRACT

A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method includes sequentially or substantially simultaneously reading out lines 1, 3 and 5 into the vertical shift register that keeps the colors separated; summing the charge in lines 1, 3 and 5; sequentially or substantially simultaneously reading out lines 2 and 4 into the vertical shift register that keeps the colors separated; summing the charge in lines 2 and 4; transferring one or more rows of the summed charge into a first horizontal charge-coupled device; transferring alternate charges in the first horizontal charge-coupled device into a second horizontal charge-coupled device; summing sets of two charges in the first horizontal charge-coupled device; summing sets of two charges in the second horizontal charge-coupled device; and reading out the charge in both the first and second horizontal shift register with a half-resolution clocking sequence.

20 Claims, 22 Drawing Sheets general 2x2 pattern

Bayer pattern field 1 field 2

IMAGE SENSOR FOR STILL OR VIDEO PHOTOGRAPHY

FIELD OF THE INVENTION

The invention relates generally to the field of image sensors for still photography and, more particularly, to producing video of five times less vertical resolution from such image sensors typically used for still photography by sampling the entire array of the image sensor and summing all pixel values in a predetermined manner.

BACKGROUND OF THE INVENTION

Referring to FIG. 1, an interline charge coupled device (CCD) image sensor 10 is comprised of an array of photodiodes 20. The photodiodes are covered by color filters to allow only a narrow band of light wavelengths to generate charge in the photodiodes. Typically image sensors have a filter with a pattern of three or more different colors arranged spanning over the photodiodes in a 2×2 sub array as shown in FIG. 2. For the purpose of a generalized discussion, the 2×2 array is assumed to have four colors, A, B, C, and D. The most common color filter pattern used in digital cameras is often referred to as the Bayer pattern: color A is red, colors B and C are green, and color D is blue.

Referring back to FIG. 1, image readout of the photo-generated charge begins with the transfer of some or all of the photodiode charge to the vertical CCD (VCCD) 30. In the case of a progressive scan CCD, every photodiode simultaneously transfers charge to the VCCD 30. In the case of a two field interlaced CCD, first the even numbered photodiode rows transfer charge to the VCCD 30 for first field image readout, then the odd numbered photodiode rows transfer charge to the VCCD 30 for second field image readout.

Charge in the VCCD 30 is read out by transferring all columns in parallel one row at a time into the horizontal CCD (HCCD) 40. The HCCD 40 then serially transfers charge to an output amplifier 50.

FIG. 1 shows an array of only 24 pixels. Many digital cameras for still photography employ image sensors having millions of pixels. A 10-megapixel image sensor would require at least ⅓ second to read out at a 40 MHz data rate. This is not suitable if the same camera is to be used for recording video. A video recorder requires an image read out in ¹⁄₃₀ second. The shortcoming to be addressed by the present invention is how to use an image sensor with more than 1 million pixels as both a high quality digital still camera and 30 frames/second video camera.

The prior art addresses this problem by providing a video image at a reduced resolution (typically 640×480 pixels). For example, an image sensor with 3200×2400 pixels would have only every fifth pixel read out as described in U.S. Pat. No. 6,342,921. This is often referred to as sub-sampling, or sometimes as thinned out mode or skipping mode. The disadvantage of sub-sampling the image by a factor of 5 is only 4% of the photodiodes are used. A sub-sampled image suffers from reduced photosensitivity and alias artifacts. If a sharp line focused on the image sensor is only on the un-sampled pixels, the line will not be reproduced in the video image. Other sub-sampling schemes are described in U.S. Pat. Nos. 5,668,597 and 5,828,406.

Prior art including U.S. Pat. No. 6,661,451 or U.S. patent application publication No. 2002/0135689 A1 attempt to resolve the problems of sub-sampling by summing pixels together. However, this prior art still leaves some pixels un-sampled.

U.S. patent application publication No. 2001/0010554 A1 increases the frame rate by summing pixels together without sub-sampling. However, it requires a two field interlaced read out. It is more desirable to obtain a video image with progressive scan read out. Interlaced video acquires the two fields at different times. A moving object in the image will appear in different locations when each interlaced field is acquired.

Another disadvantage of the prior art is it only reduces the image resolution in the vertical direction. In the horizontal direction, the HCCD must still read out every pixel. Only reducing the image resolution through sub-sampling or other methods in the vertical direction does not increase the frame rate to 30 frames/second for very large (greater than 8 million pixels) image sensors.

U.S. patent application publication No. 2003/0067550 A1 reduces the image resolution vertically and horizontally for even faster image readout. However, this prior art requires a striped color filter pattern (a 3×1 color filter array), which is generally acknowledged to be inferior to the Bayer or 2×2 color filter array patterns.

If an image sensor has a resolution of 5120×3840 pixels then a factor of five resolution reduction would produce an image matching the XVGA video resolution standard of 1024×768 pixels. The prior art U.S. Pat. No. 6,342,921 provides a method of a 5× resolution reduction through sub-sampling. Instead of sub-sampling, a method for a 5× resolution reduction is needed that samples all pixels of the image sensor.

In view of the deficiencies of the prior art, an invention is desired which is able to produce 30 frames/second video from a megapixel image sensor with a 2×2 color filter pattern while sampling 100% of the pixel array and reading out the video image progressive scan (non-interlaced).

SUMMARY OF THE INVENTION

The present invention is directed to overcoming one or more of the problems set forth above. Briefly summarized, according to one aspect of the present invention, the invention resides in a method for reading out charge from an interlined CCD having a plurality of photo-sensing regions and a plurality of vertical shift registers, and each photo-sensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method includes (a) sequentially or substantially simultaneously reading out lines 1, 3 and 5 into the vertical shift register that keeps the colors separated; (b) summing the charge in lines 1, 3 and 5; (c) sequentially or substantially simultaneously reading out lines 2 and 4 into the vertical shift register that keeps the colors separated; (d) summing the charge in lines 2 and 4; (e) transferring one row of the summed charge into a first horizontal charge-coupled device; (f) transferring alternate charges in the first horizontal charge-coupled device into a second horizontal charge-coupled device; (g) summing sets of two charges in the first horizontal charge-coupled device; (h) summing sets of two charges in the second horizontal charge-coupled device; and (i) reading out the charge in both the first and second horizontal shift register with a half-resolution clocking sequence.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention includes the advantage of reducing the image sensor resolution by a factor of 5 while sampling the entire pixel array.

DETAILED DESCRIPTION OF THE INVENTION

Figure 3:
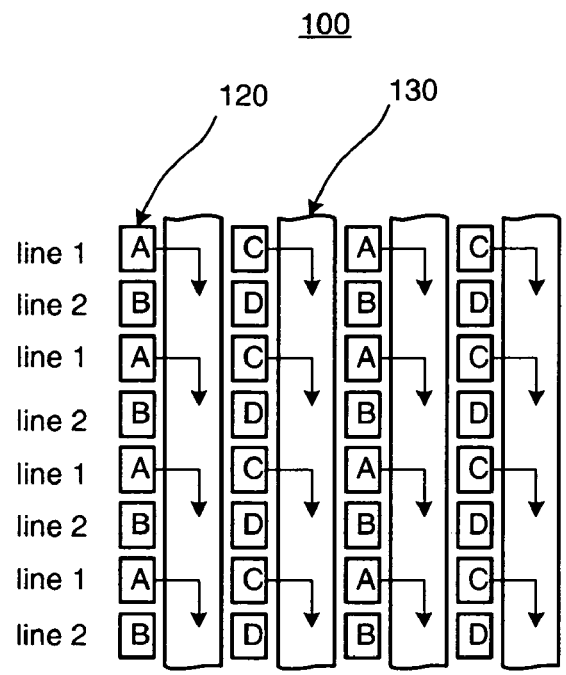
FIG. 3 is a diagram illustrating the flow of charge for reading out the first field of a two field interlaced image sensor of the present invention.

Referring to FIG. 3, there is shown the image sensor 100 of the present invention. For clarity, only a portion of the pixel array of the image sensor 100 is shown. It consists of an array of photodiodes 120 with VCCDs 130 positioned in between columns of photodiodes 120. Color filters are repeated in a 2×2 array spanning across the entire photodiode array. The 4 color filters A, B, C, and D are of 3 or 4 unique colors. The colors typically are, but not limited to, A=red, B=C=green, D=blue. Other common color schemes utilize cyan, magenta, and yellow or even white filters.

Figure 5:
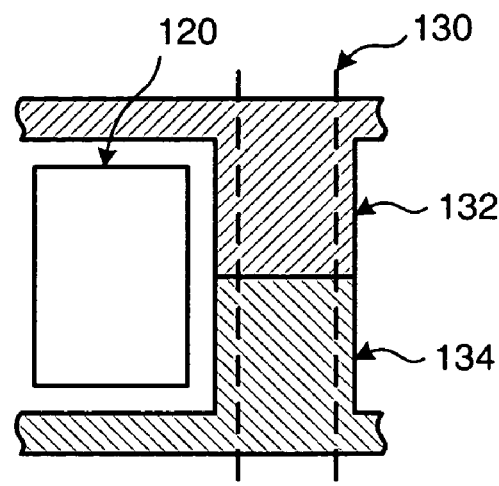
FIG. 5 is a detailed view of a pixel of the present invention including the VCCD.

Referring briefly to FIG. 5, one pixel is shown. The VCCD 130 is of the interlaced 4-phase type with two control gate electrodes 132 and 134 per photodiode 120.

Figure 4:
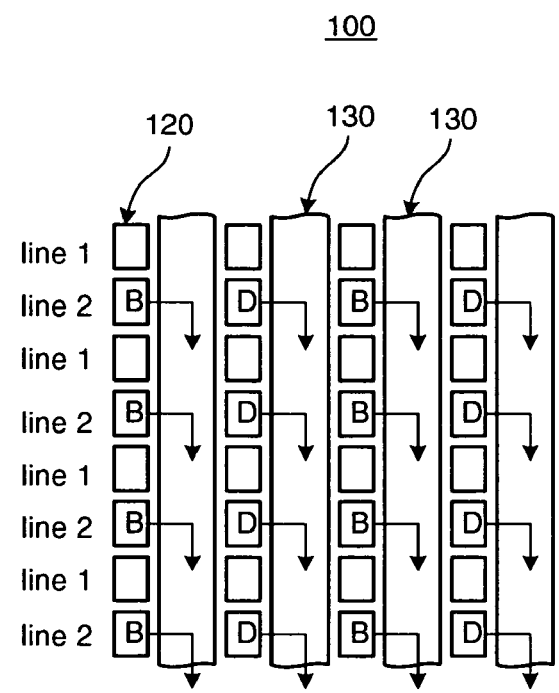
FIG. 4 is a diagram illustrating the flow of charge for reading out the second field of a two field interlaced image sensor of the present invention.

Referring back to FIG. 3, the full resolution read out of an image stored in the photodiodes 120 proceeds in the below-described manner for an interlaced image sensor 100. First the charge in field 1, consisting of all lines labeled as line 1, is transferred from the photodiodes 120 to the adjacent VCCD 130. The VCCD 130 will only receive charge from lines containing colors A and C. Once charge is in the VCCD 130, it is transferred in parallel towards a serial HCCD (not shown) and then towards and output amplifier (not shown), as is well known in the art. Next in FIG. 4, after all signal from colors A and C have been transferred out of the VCCD 130, the remaining charge in the photodiodes 120 in line 2 is transferred into the VCCD 130. This is field 2 containing only colors B and D. Since the image is read out in two fields, an external shutter is used to block light and prevent further accumulation of signal in the second field while the first field is being read out.

When the sensor is installed in a digital camera and is to be used in video mode, the external shutter is held open and the image sensor 100 is operated continuously. Most applications define video as a frame rate of at least 10 frames/sec with 30 frames/sec being the most desired rate. Currently, image sensors are typically of such high resolution that full resolution image readout at 30 frames/sec is not possible at data rates less than 50 MHz and one or two output amplifiers. One solution of the present invention is to sum together pixels inside the image sensor to reduce the number of pixels down to a resolution allowing video rate imaging.

Figure 6A:
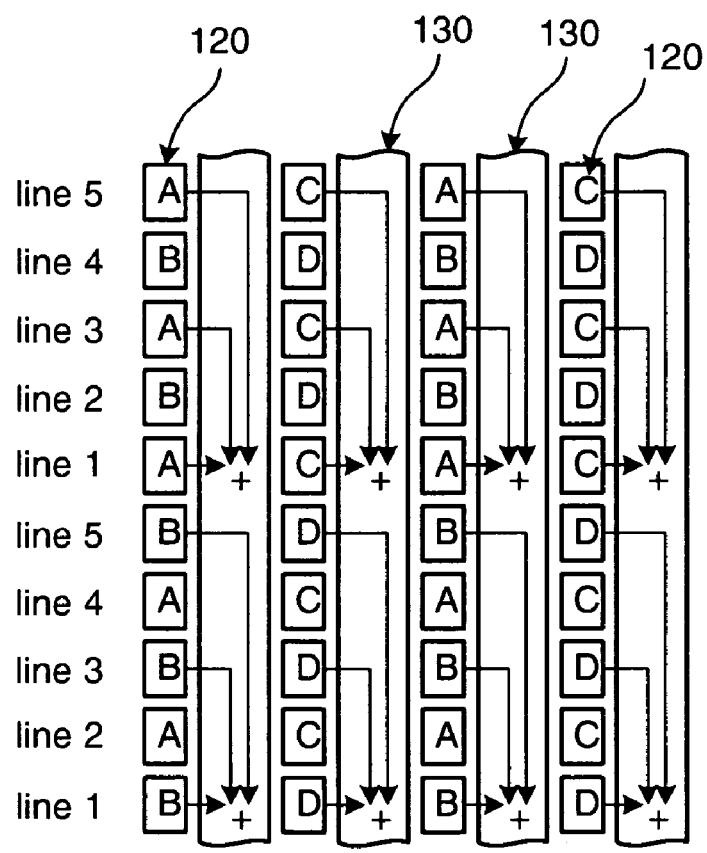
FIGS. 6a-6c are a sequence of steps of the first embodiment to reduce the image sensor resolution by a factor of 5 of the present invention.
Figure 6B:
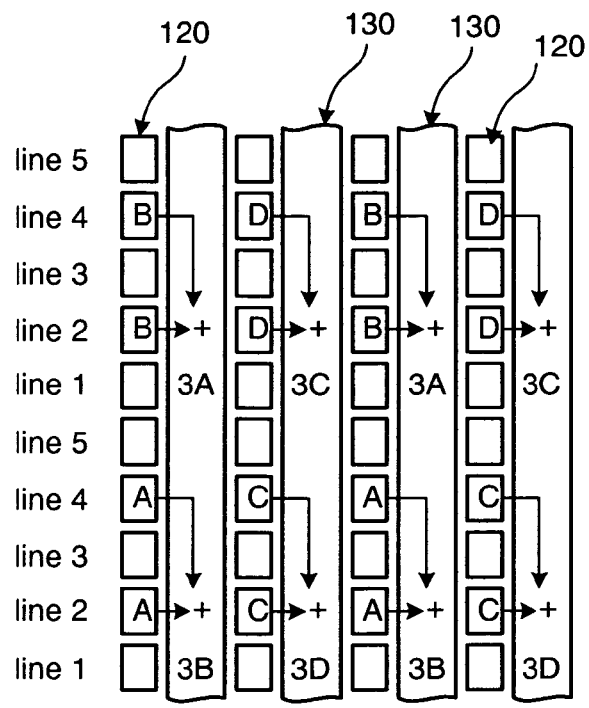
Figure 6C:
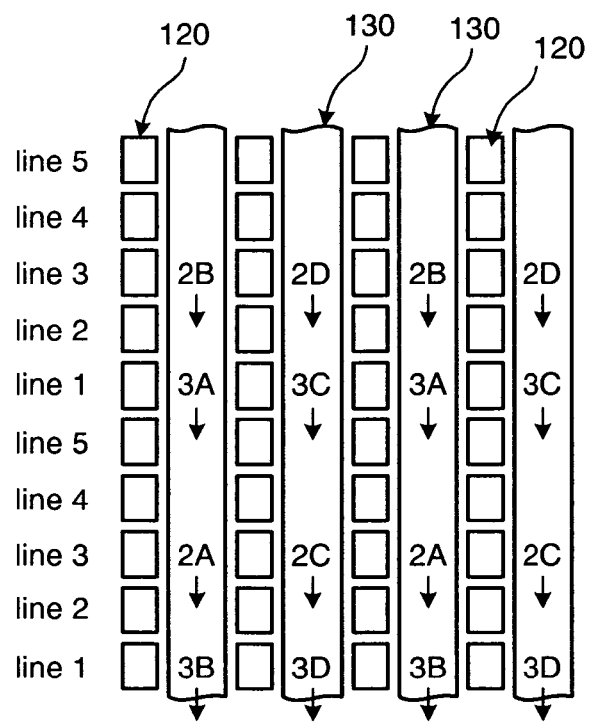

The first embodiment of the sequence of steps to reduce the image sensor 100 resolution by a factor of 5 is shown in FIGS. 6a through 6c. The rows of photodiodes 120 are grouped into five sequentially numbered lines. The first step in FIG. 6a is to simultaneously transfer charge from all of the odd numbered lines from the photodiodes 120 to the VCCD 130. The first set of three lines 1, 3, and 5 transfer colors B and D into the VCCD 130. The next set of three lines 1, 3, and 5 transfers colors A and C into the VCCD 130. If the camera is used outside in bright sunlight, the summing of pixels will enhance the sensitivity such that a very short exposure time will be required. The exposure time might be as short as 100 to 200 µs. If the photodiodes 120 from color A are transferred to the VCCD 130 before photodiodes 120 from color B, the color B photodiodes will receive a longer exposure time than the photodiodes 120 from color A. Thus, video recording with very short exposure times will show an undesirable color hue shift.

The short exposure color hue shift can be avoided by always transferring charge from photodiodes 120 of all colors simultaneously to the VCCD 130. This is shown in FIG. 6a. Since all colors are transferred at the same time, there will be no hue shift for very short exposure.

The next step shown in FIG. 6b is to transfer the remaining charge of the photodiodes 120 in the even numbered lines into the VCCD 130 and transferring one packet toward the other packet until they are mixed or summed. Transferring the even numbered lines results in two charge packets being summed together. Transferring the odd numbered lines as in FIG. 6a results in three charge packets being summed together. The step shown in FIG. 6b may be omitted to reduce the number of lines to read out to the image sensor by half. Skipping the reading out of lines 2 and 4 would cause some loss of resolution and color information but the faster frame rate might be more desirable. Alternatively, charge from lines 2 and 4 could be summed together with the charge from lines 1, 3, and 5 from the five-line group above it. That would result in the charge packets in FIG. 6c, labeled 2A and 3A, being combined into one and charge packets labeled 2B and 3B being combined into one charge packet. That reduces the total number of lines by half for faster readout.

Now in FIG. 6c, the final state of the VCCD 130 after charge summing contains the 2×2 color filter pattern of the original photodiode array with the vertical resolution decreased by 5. There are actually 2 charge packets for every 5 lines in the VCCD 130 but every pair of two charge packets are combined in the camera digital signal processing to construct the full red/green/blue color triplet of one video pixel. The charge packets in the VCCD 130 are transferred out of the imager as a single field progressive scan image. The progressive scan image eliminates problems with interlaced field separation. This read out method also samples every pixel in the image for maximum photo-sensitivity and minimal moire artifacts and minimal color alias. Progressive scan read out also enables electronic shutter exposure control.

Figure 7:
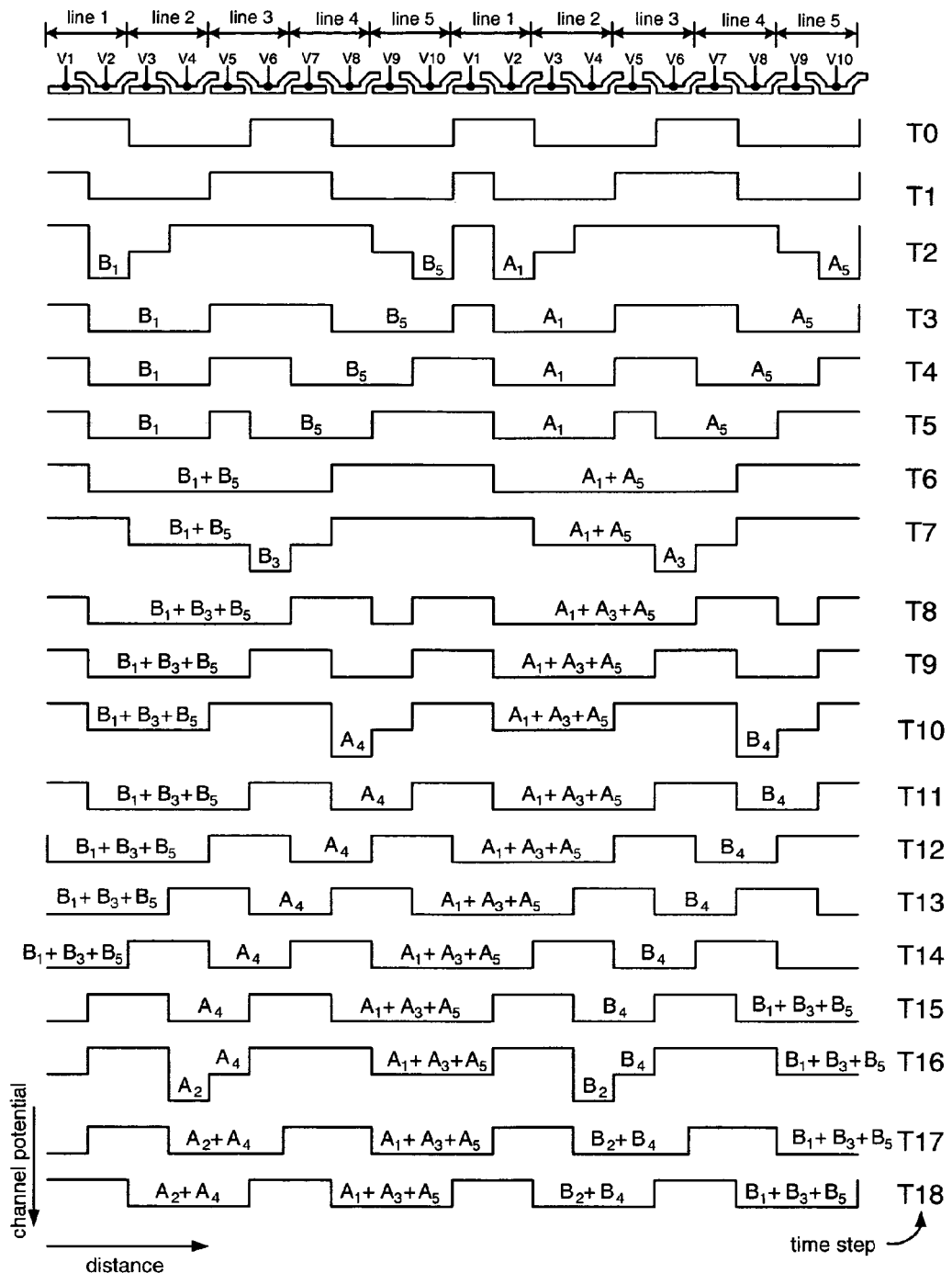
FIG. 7 is a detail of the clocking of charge packets showing the channel potential under the control gate electrodes of the present invention.
Figure 8:
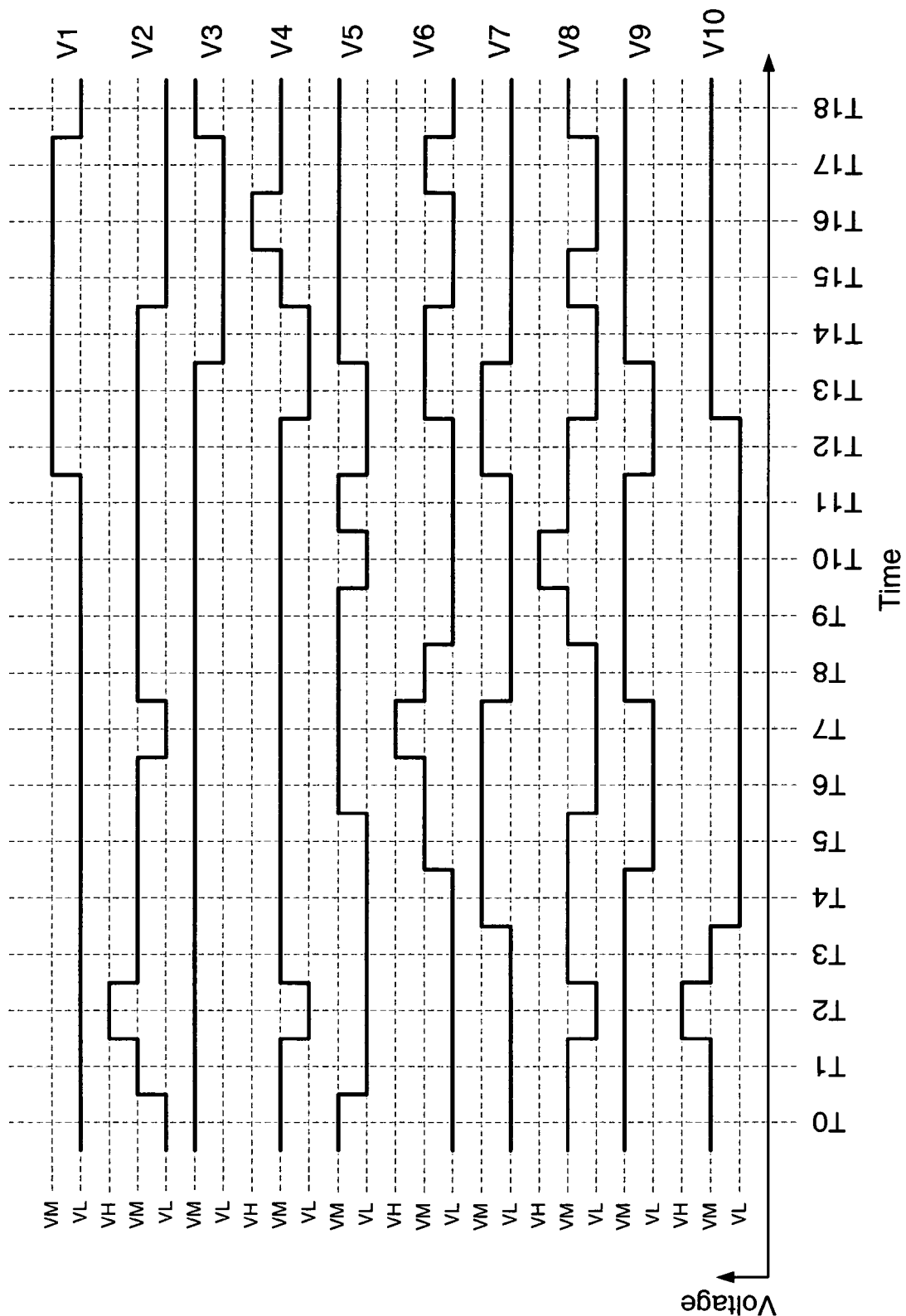
FIG. 8 is a timing diagram for gate voltages of FIG. 7.

Referring to FIG. 7, the details of the clocking of charge packets are shown. FIG. 7 is a cross section down the center of the VCCD 130 of the column containing pixels of colors A and B. The labels A or B and a numerical subscript identify the charge packets. The letter identifies which color photodiode the charge packet originated from. The subscript identifies which photodiode line the charge packet originated from. The labels T0 through T18 mark the time steps of the charge transfer clocking sequence. The gates in FIG. 7 are wired to 10 control voltages V1 through V10. The voltages applied to each of the gates at each time step are shown in FIG. 8. The voltage on a gate is one of three levels: VL is the lowest level creating a barrier in the VCCD channel potential (the off state), VM is the middle level creating a well in the VCCD channel potential (the on state), VH is the high level which turns on the transfer channel between the photodiodes and VCCD.

In FIG. 7, the clocking sequence first transfers only lines 1 and 5 to the VCCD at time step T2. Lines 1 and 5 are then summed together at time step T6 and then Line 3 is transferred into that summed charge packet at time step T6. This illustrates that the process of transferring charge from the photodiodes to VCCD in lines 1, 3, and 5 may occur in separate sequential time steps or all together at the same time.

Figure 9A:
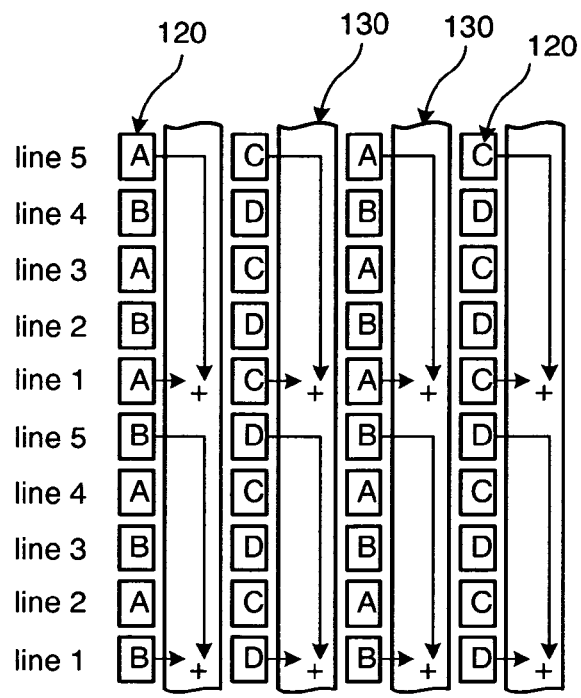
FIGS. 9a-9c are the second embodiment illustrating summing charge packets of equally weighted colors.
Figure 9B:
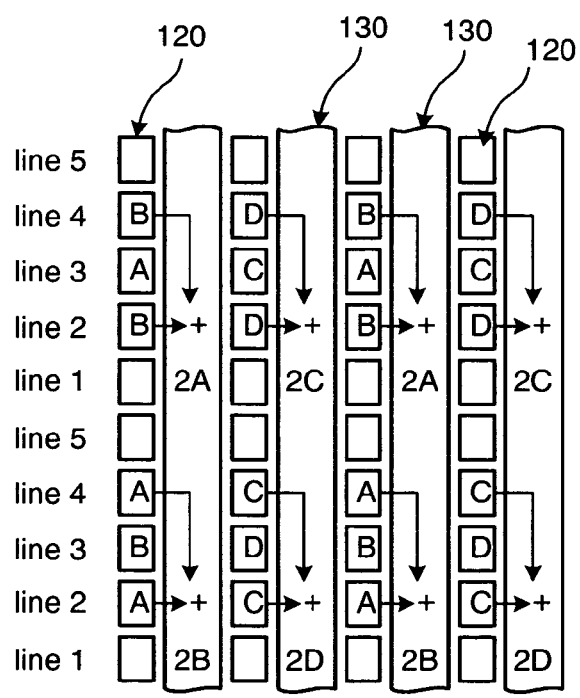
Figure 9C:
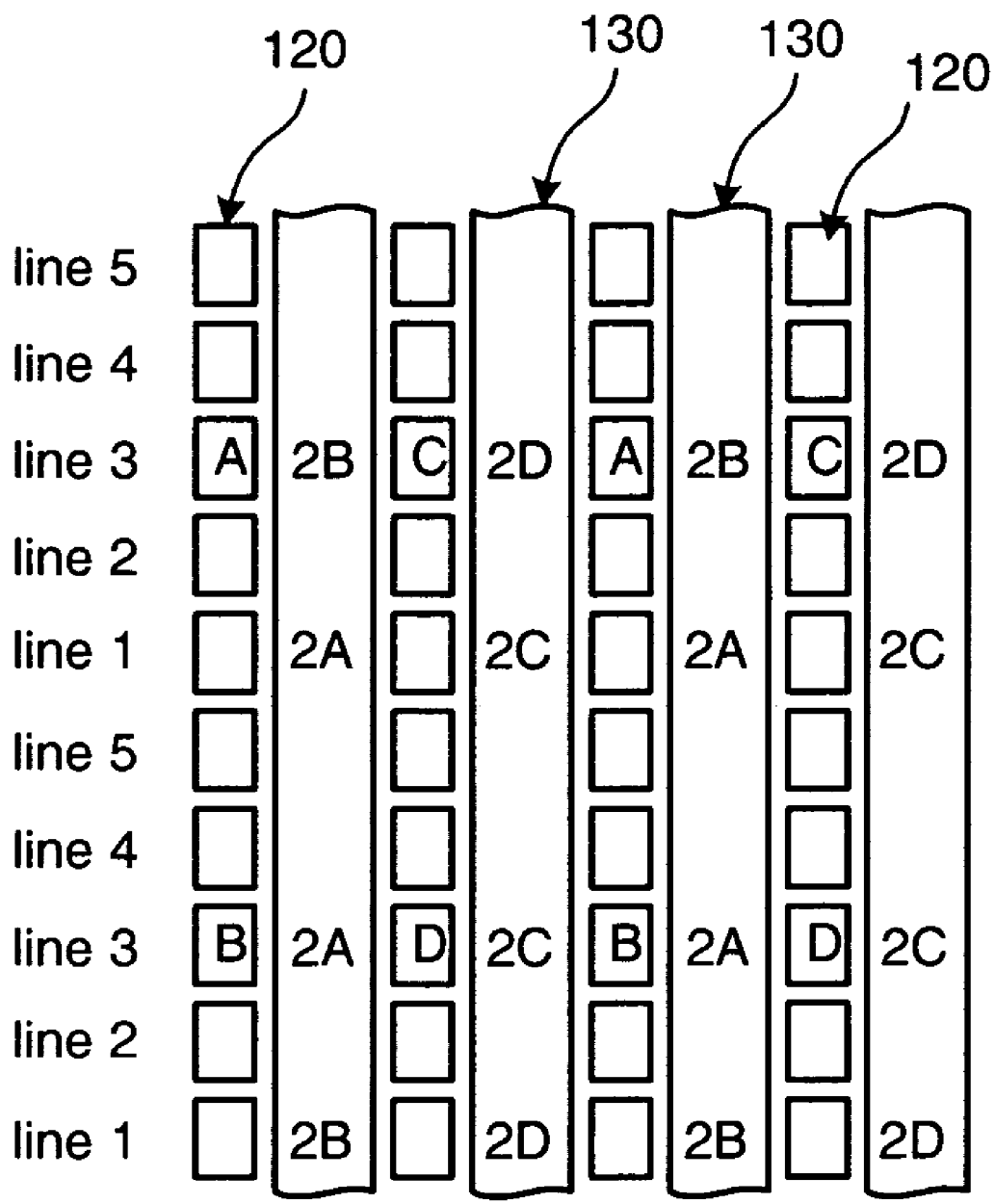

After the summing process, the charge packets in the VCCD 130 as shown in FIG. 6c are not equally weighted. One charge packet contains charge from 3 photodiodes of color B and another contains charge from 2 photodiodes of color B. An alternate second embodiment of the summing process to obtain charge packets of equally weighted colors is shown in FIGS. 9a, 9b and 9c. In FIG. 9a, lines 1 and 5 are summed together and the line 3 photodiodes 120 are not transferred to the VCCD 130. Next in FIG. 9b, charge from lines 2 and 4 are transferred and summed together in the VCCD 130. The step shown in FIG. 9b may be omitted to reduce the number of lines to read out to the image sensor by half. Skipping the reading out of lines 2 and 4 would cause some loss of resolution and color information but the faster frame rate might be more desirable. The resulting summed charge packets in FIG. 9c are transferred in parallel towards a serial readout CCD register(s). The photodiodes 120 from line 3 are never transferred into the VCCD 130.

Figure 10:
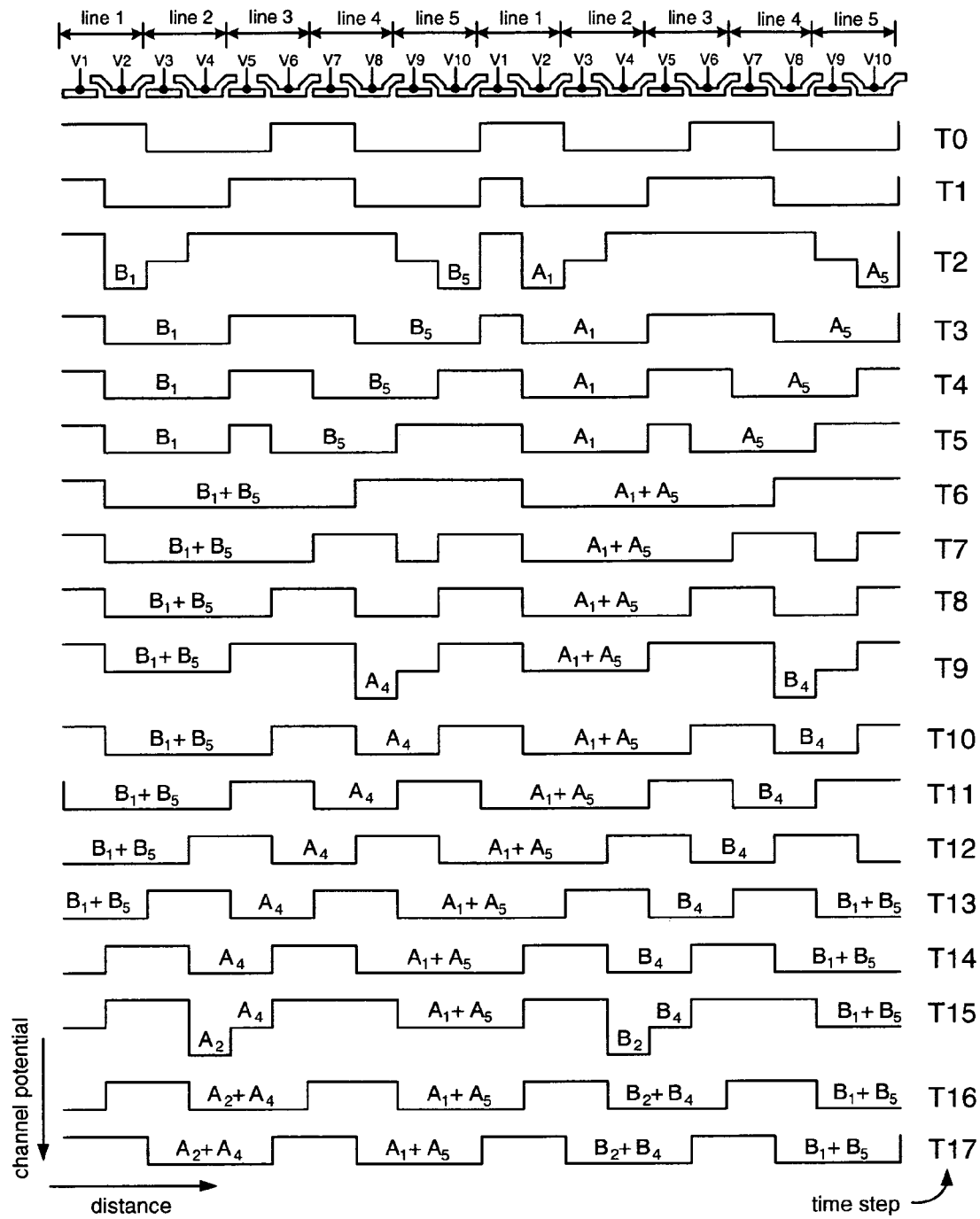
FIG. 10 is the second embodiment detail of the clocking of charge packets of equally weighted colors of FIGS. 9a-9c.

FIG. 10 shows the charge packet clocking details for FIGS. 9a through 9c. FIG. 10 is a cross section down the center of the VCCD 130 of the column containing pixels of colors A and B. The labels A or B and a numerical subscript identify the charge packets. The letter identifies which color photodiode the charge packet originated from. The subscript identifies which photodiode line the charge packet originated from. The labels T0 through T17 mark the time steps of the charge transfer clocking sequence. The gates in FIG. 10 are wired to 10 control voltages V1 through V10. The only difference between FIG. 10 and FIG. 7 is the omission of time step T7 from FIG. 7 where charge from line 3 is transferred into the VCCD. Note that in time step T2 of FIG. 10 four photodiodes are transferred into the VCCD simultaneously while the remaining four photodiodes are transferred into the VCCD sequentially in time steps T9 and T15. This illustrates the summing process may take place through simultaneous transfers to the VCCD or sequential transfers to the VCCD.

Figure 11A:
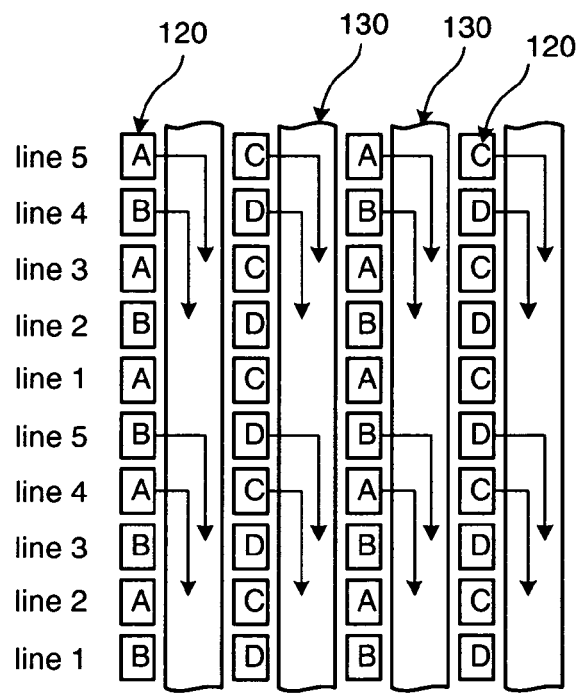
FIGS. 11a-11c are the third embodiment illustrating summing charge packets of equally weighted colors.
Figure 11B:
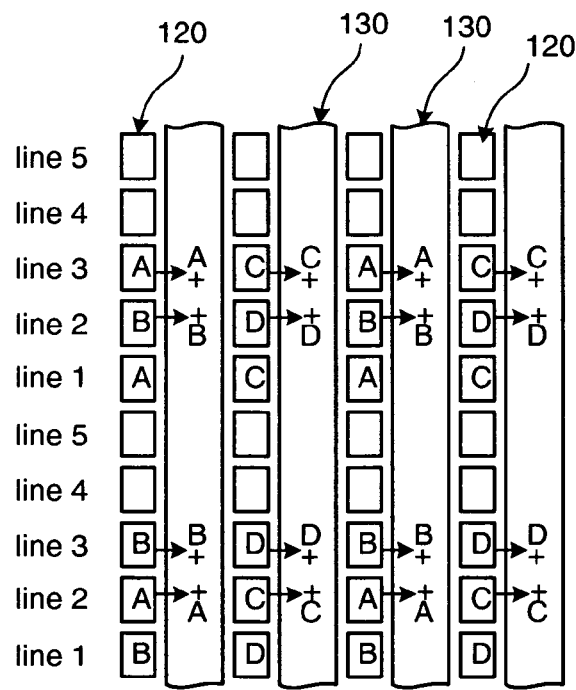
Figure 11C:
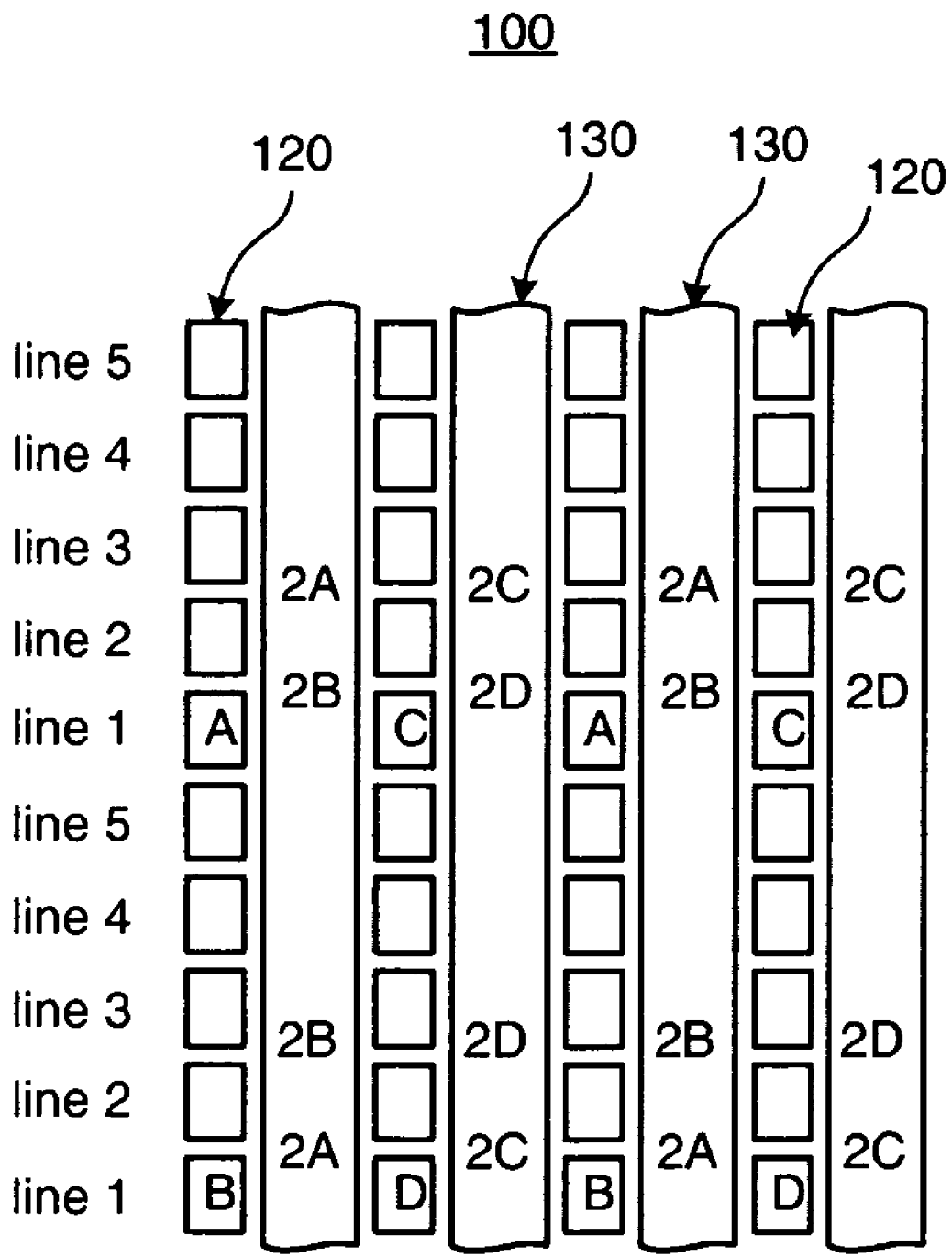

A third embodiment of the charge summing process is shown in FIGS. 11a, 11b, and 11c. In FIG. 11a charge from lines 4 and 5 are simultaneously transferred from the photodiodes 120 to the VCCD 130. The charge packets in the VCCD are kept separate to avoid mixing colors. Then the two charge packets are transferred down two lines in the VCCD. This aligns the charge packet that originated from line 5 with the photodiode in line 3. The charge packet that originated from line 4 will be aligned with the photodiode in line 2. Next in FIG. 11b, charge is transferred from the photodiodes in lines 2 and 3 into and on top of the charge packets already in the VCCD. The result is shown in FIG. 11c where there are now two charge separate packets of two colors in each column. The photodiodes in line 1 are never transferred into the VCCD. The charge packets in the VCCD are transferred in parallel towards a serial readout CCD register(s).

Figure 12:
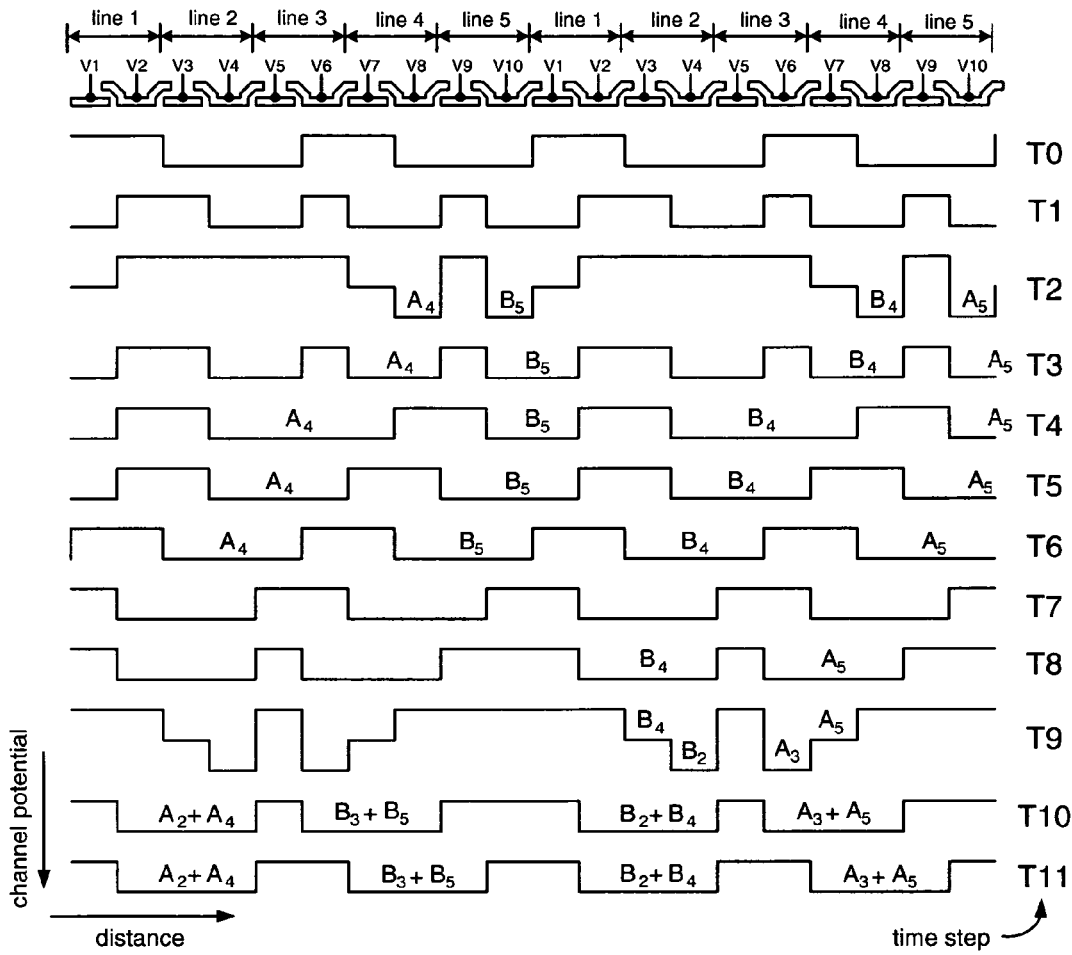
FIG. 12 is the third embodiment for the detail of the clocking of charge packets of equally weighted colors of FIGS. 11a-11c.

FIG. 12 shows the charge packet clocking details. FIG. 12 is a cross section down the center of the VCCD 130 of the column containing pixels of colors A and B. The labels A or B and a numerical subscript identify the charge packets. The letter identifies which color photodiode the charge packet originated from. The subscript identifies which photodiode line the charge packet originated from. The labels T0 through T11 mark the time steps of the charge transfer clocking sequence. The gates in FIG. 12 are wired to 10 control voltages V1 through V10.

Thus far the present invention discloses how to sum together two lines or three lines of charge packets to increase the frame rate and decrease the vertical resolution by a factor of 5. It is also desirable to reduce the horizontal resolution of the image sensor. Reducing the horizontal resolution by a factor of two will double the frame rate of the video image. This is accomplished by also summing together charge packets in the HCCD.

Figure 1:
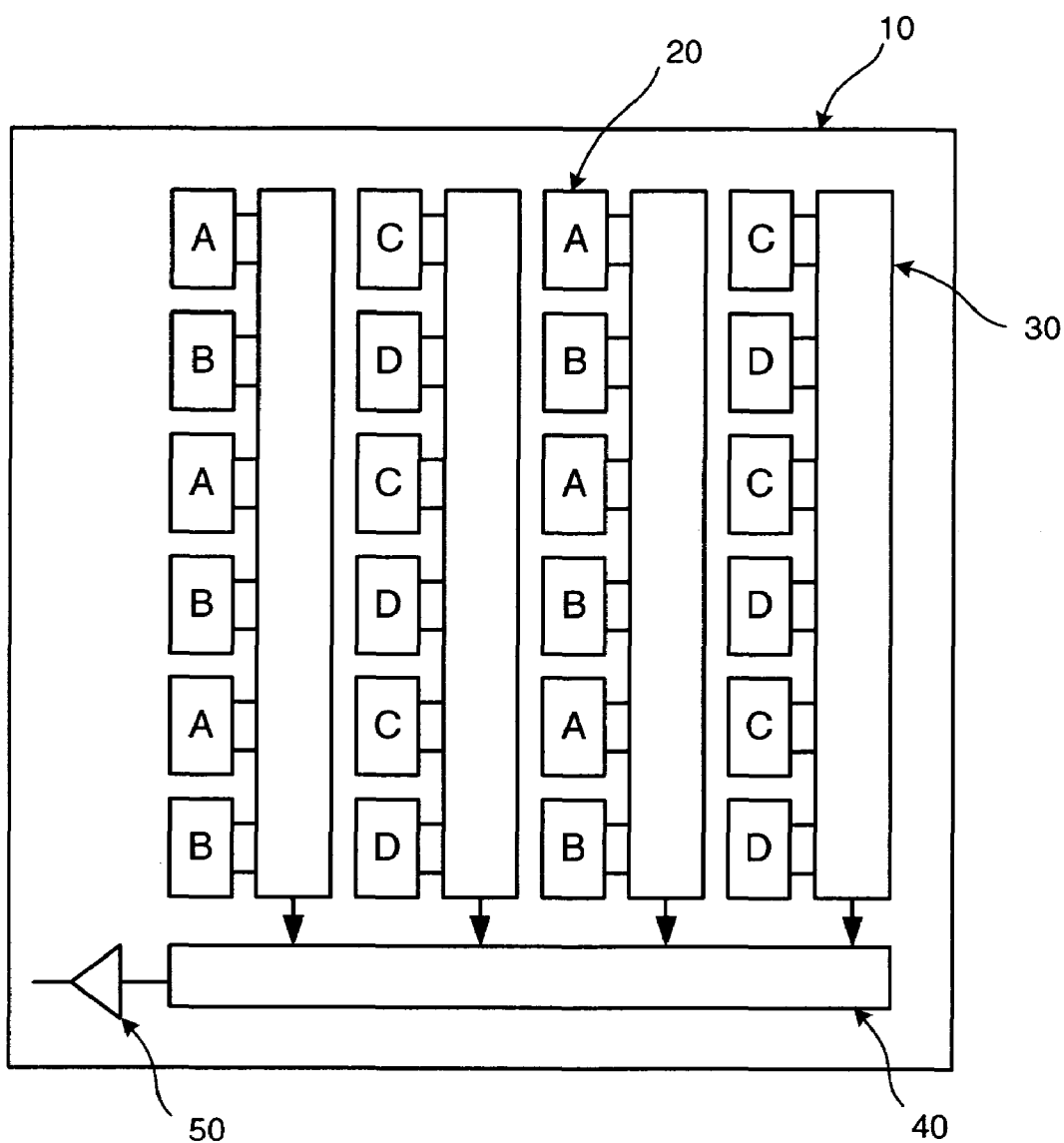
FIG. 1 is a prior art image sensor.
Figure 13:
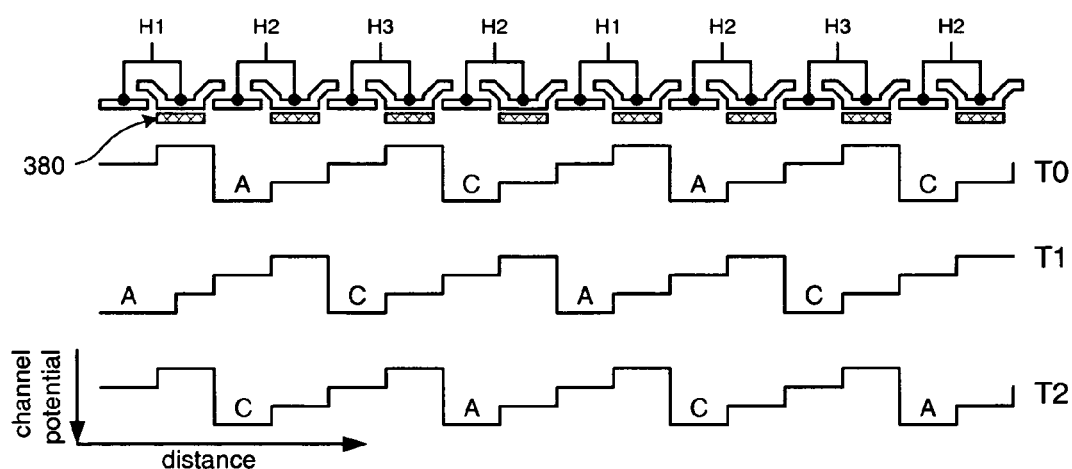
FIG. 13 is a side view of a prior art HCCD including channel potential diagrams at various time steps of the clocking sequence for charge transfer in a pseudo-2-phase HCCD.
Figure 14:
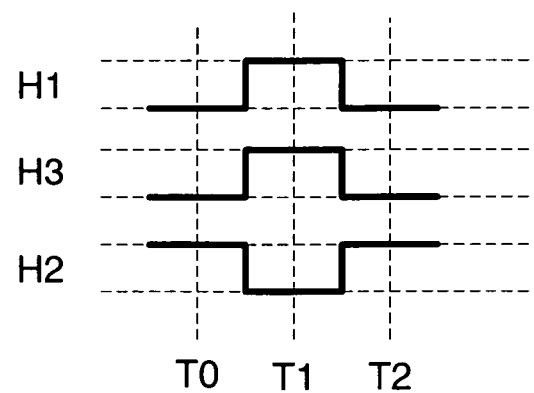
FIG. 14 is a timing diagram for FIG. 13.

Referring to FIG. 13, there is shown a well-known prior art HCCD. It is a pseudo-two phase CCD employing four control gates per column. Each pair of two gates H1, H2 and H3 are wired together with a channel potential implant adjustment 380 under one of the two gates. The channel potential implant adjustment 380 controls the direction of charge transfer in the HCCD. Charge is transferred from the VCCD one line at a time under the H2 gates of the HCCD. FIG. 13 shows the presence of charge packets from the line containing colors A and C from FIG. 1. The charge packets are advanced serially one row through the HCCD at time steps T0, T1, and T2, by applying the clock signals of FIG. 14.

Figure 2:
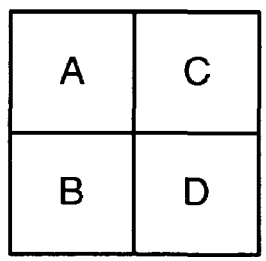
FIG. 2 is a typical color filter array for image sensors.
Figure 2:
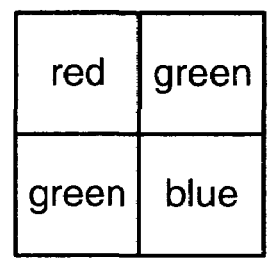
Figure 15:
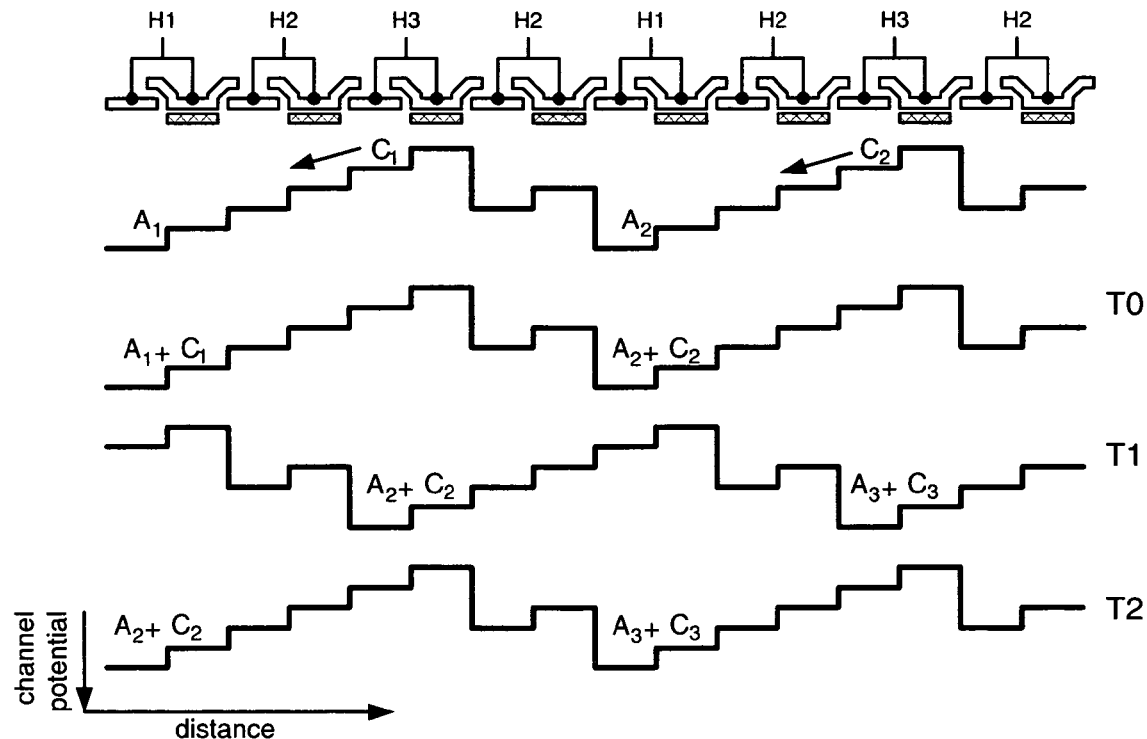
FIG. 15 is a side view of a prior art HCCD including channel potential diagrams at various time steps of the clocking sequence for charge transfer in a pseudo-2-phase double speed HCCD.
Figure 16:
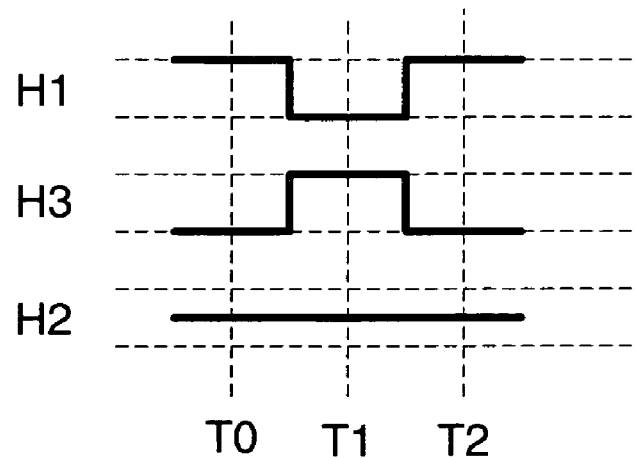
FIG. 16 is a timing diagram for FIG. 15.

U.S. Pat. No. 6,462,779 provides a method of summing two pixels in the HCCD to reduce the total number of HCCD clock cycles in half. This is shown in FIG. 15. This method is designed for linear or area image sensors where all pixels are of one color. In a two dimensional array employing the 2×2 color pattern of FIG. 2, each line has more than one color. Thus, in FIG. 15, when a line containing colors A and C is transferred into the HCCD and clocked with the timing of FIG. 16 the colors A and C are added together. That destroys the color information of the image.

Figure 17:
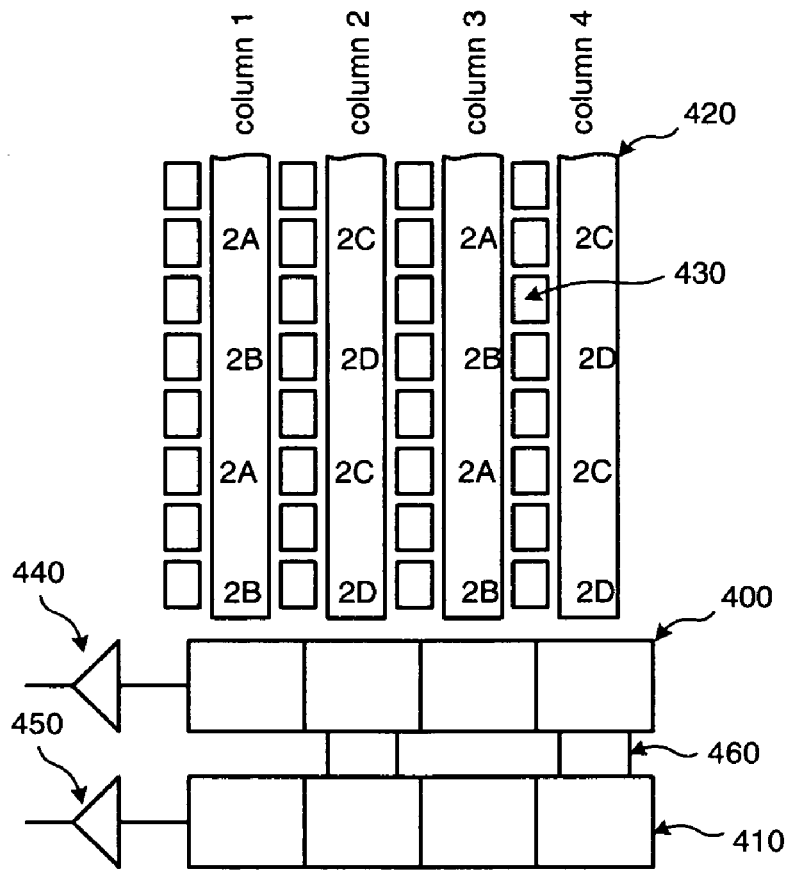
FIG. 17 is the image sensor of the present invention including the VCCDs containing summed charge packets and dual output HCCDs.
Figure 18:
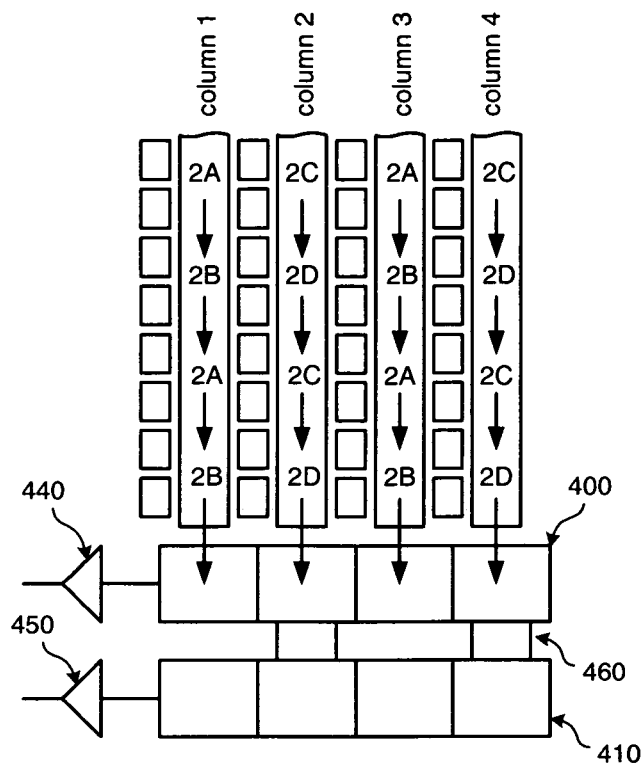
FIG. 18 is the image sensor of the present invention illustrating the transfer of summed charge packets into the first HCCD.

The present invention shown in FIG. 17 provides a method to prevent the mixing of colors when summing pixels in the HCCD. The invention consists of an array of photodiodes 430 covered by a 2×2 color filter pattern of four colors A, B, C, and D. Charge packets from the photodiodes 430 are transferred and summed vertically in the VCCD 420 using one of the three embodiments for vertical line summing described earlier. The two-line summing is depicted in FIG. 17. There is a first HCCD 400 and second HCCD 410 located at the bottom of the pixel array. There is a transfer channel 460 in every other column for the purpose of transferring half of the charge packets from the first HCCD 400 to the second HCCD 410. There is an output amplifier 440 and 450 at the end of each HCCD 400 and 410 for converting the charge packets to a voltage for further processing.

Figure 19:
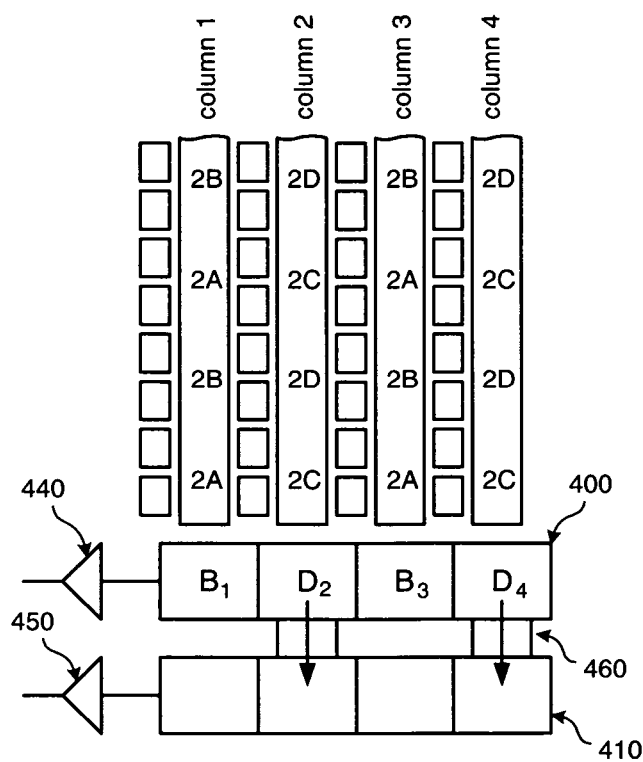
FIG. 19 is the image sensor of the present invention illustrating the transfer of half of the summed charge packets from the first HCCD into the second HCCD.
Figure 20:
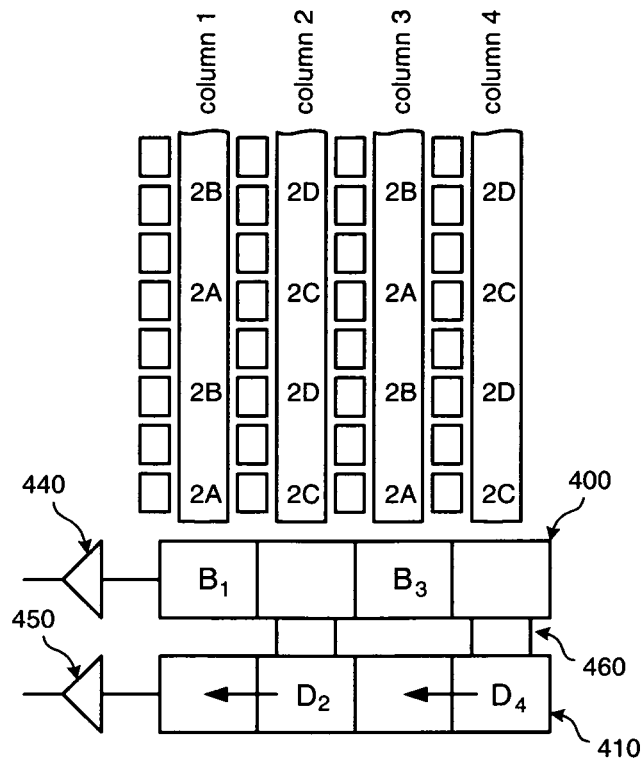
FIG. 20 is the image sensor of the present invention illustrating the transfer of summed charge packets in the second HCCD to align charge in the second HCCD with the first HCCD.
Figure 21:
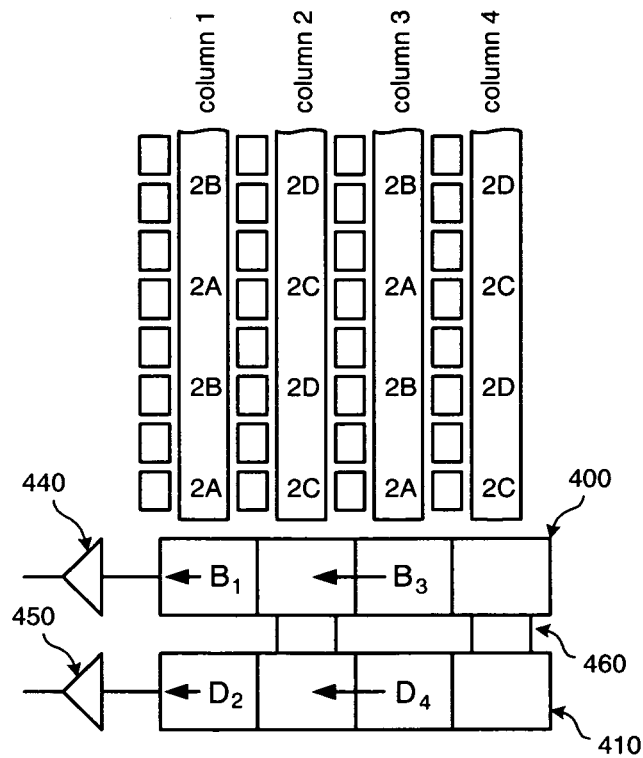
FIG. 21 is the image sensor of the present invention illustrating the transfer of charge in the first and second HCCD towards the output amplifiers without horizontal charge packet summing.

FIGS. 18 through 21 illustrates the charge transfer sequence for reading out one line through the HCCD. First in FIG. 18 one line containing colors A and C is transferred into the first HCCD 400 as shown in FIG. 19. Charge packets are labeled with a letter corresponding to the color and a subscript corresponding to the column from which the charge packet originated. In FIG. 20, the charge packets from the even numbered columns only pass through the transfer gate 460 and into the second HCCD 410. In FIG. 20, the charge packets in the second HCCD 410 are advanced by one column to align them with the charge packets in the first HCCD 400. The number of clock cycles needed to read out each HCCD in FIG. 21 is equal to one half the number of columns in the HCCD. The addition of a second HCCD 410 reduces the read out time by half. Most importantly, each HCCD now contains only one color type.

Figure 22:
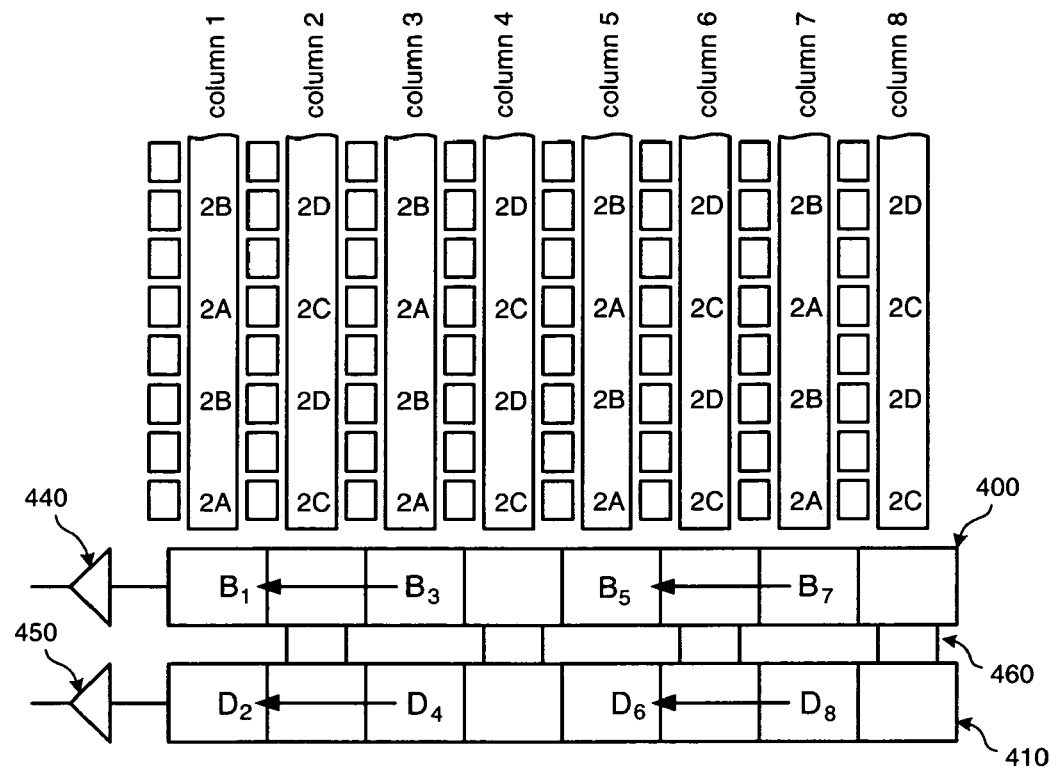
FIG. 22 is the image sensor of the present invention illustrating the process of the horizontal summing of charge packets of FIG. 21.
Figure 23:
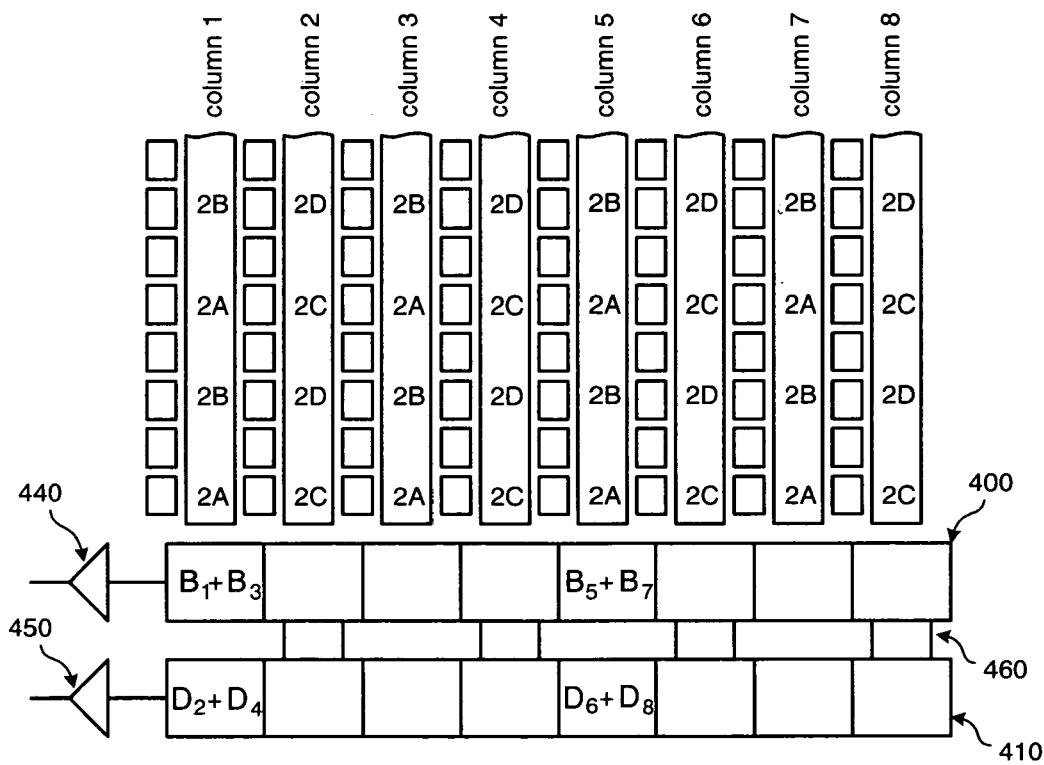
FIG. 23 is the image sensor of the present invention illustrating the result of the horizontal summing of charge packets of FIG. 21.

Two charge packets may be summed together horizontally in each HCCD 400 and 410 as shown in FIGS. 22 and 23. The summing is done without mixing charge packets of different colors. The two pixel summing reduces the number of charge packets to read out of each HCCD 400 and 410 by another factor of two. This HCCD design provides a total speed improvement of a factor of four. Combined with the two line or three line summing described earlier allows an eight or twelve fold increase in frame rate for a video mode.

Figure 24:
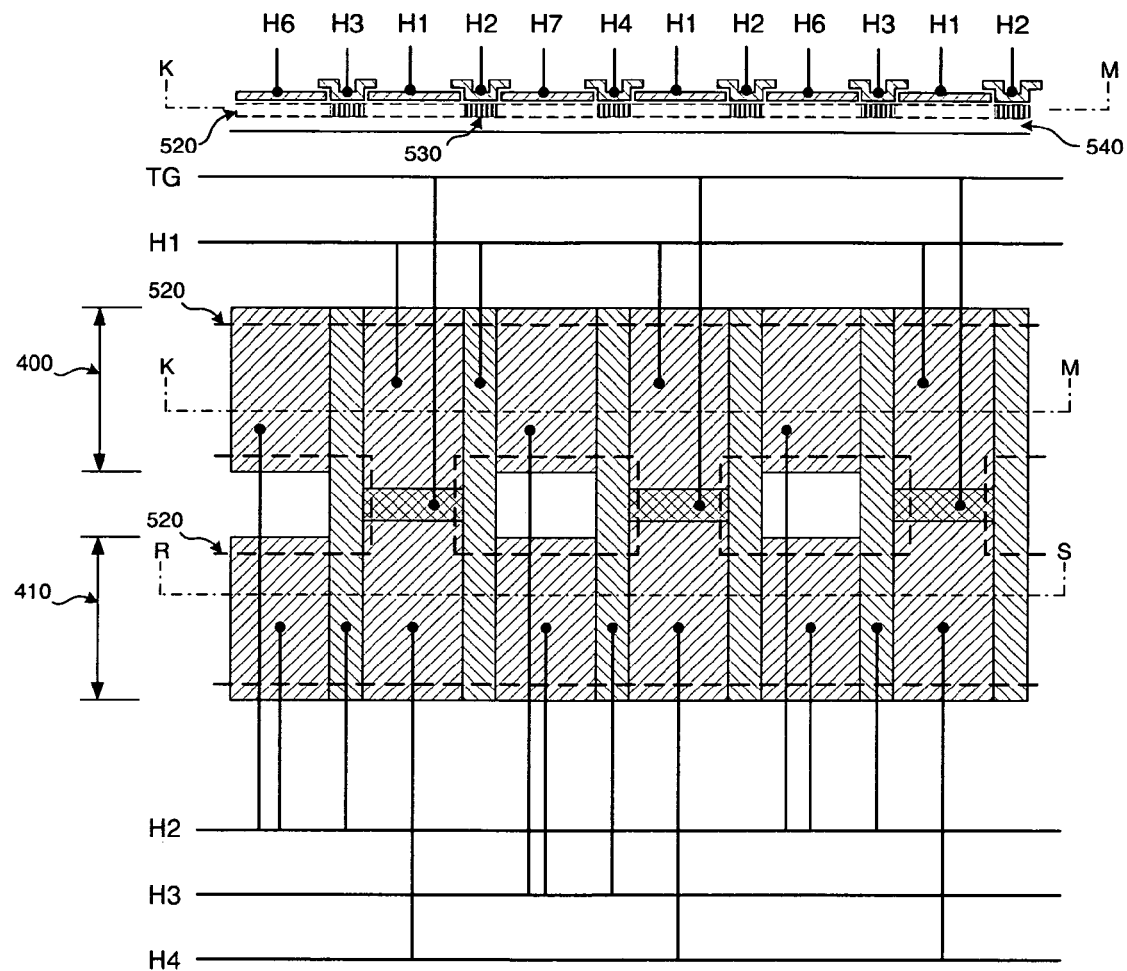
FIG. 24 is a detailed view of the dual HCCD gate electrode layout.

FIG. 24 shows the HCCD structure in greater detail. There is the first HCCD 400 and second HCCD 410 fabricated on top of an n-type buried channel CCD 520 in a p-type well or substrate 540. There are p-type channel potential adjustment barrier implants 530 to control the direction of charge transfer in the first and second HCCD. The top portion of FIG. 24 shows the side view cross section K-M through the first HCCD 400. There are four wires, which supply the control voltages to the HCCD gates H1 through H4. An additional wire TG controls the transfer gate between the two channels. The gate electrodes are typically, but not required to be, poly-silicon material of at least two levels. A third level of poly-silicon may be used for the transfer gate if the manufacturing process used does not allow the first or second levels of poly-silicon to be used. With careful use of implants in the buried channel of the transfer gate region and slightly modified gate voltages the transfer gate can be omitted entirely. The exact structure of the transfer gate is not important to the function of the invention.

Figure 25:
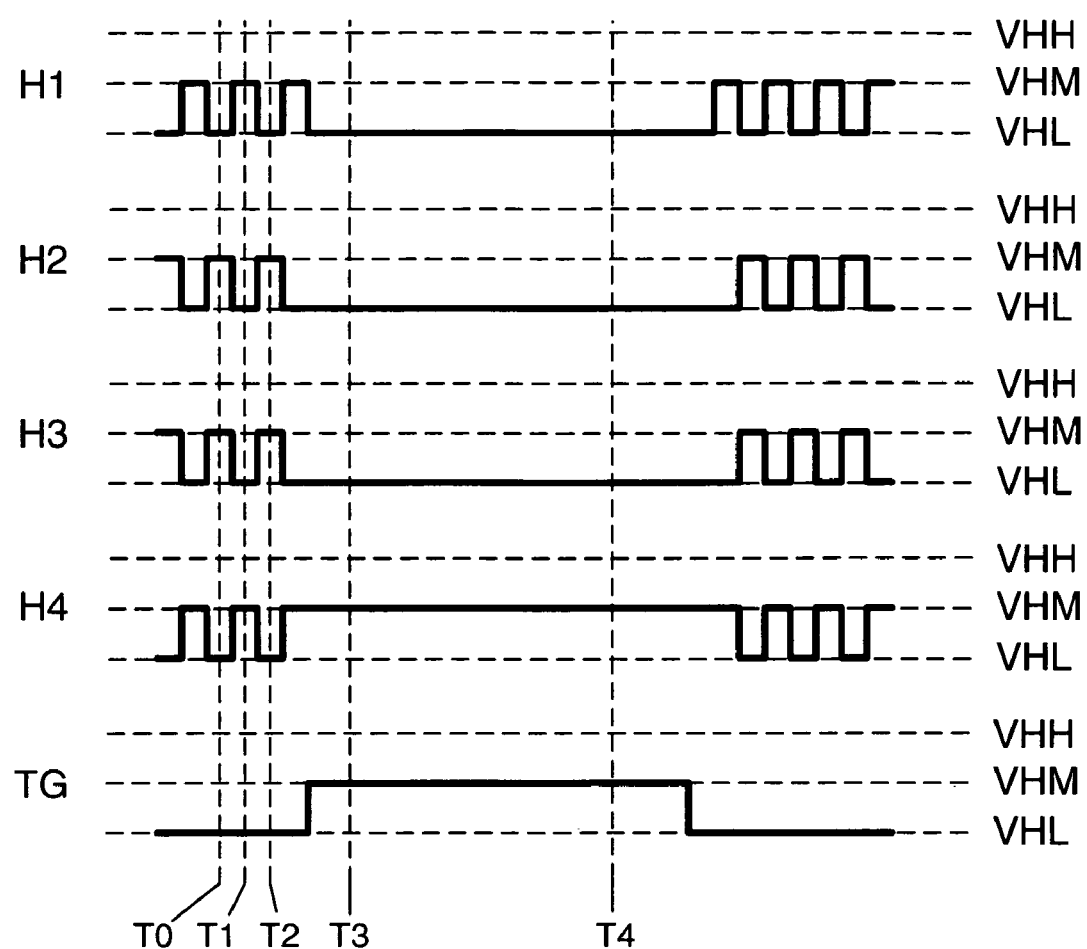
FIG. 25 is a timing diagram for full resolution readout of the HCCD of FIG. 24.

The clock voltages applied to the HCCD of FIG. 24 for full resolution read out are shown in FIG. 25. At time T3 of FIG. 25, the H1, H2 and H3 gates are switched low to receive charge from the first HCCD 400. At time T3 the transfer gate TG is also turned on and H4 is clocked high. On every other column charge will flow from the VCCD into gate H1 across the transfer gate TG and finally rest under gate H4. For the other columns the charge will stay in the first HCCD 400. TG is turned off after time T4 and the HCCD gates are then clocked to advance charge towards an output amplifier.

Figure 27:
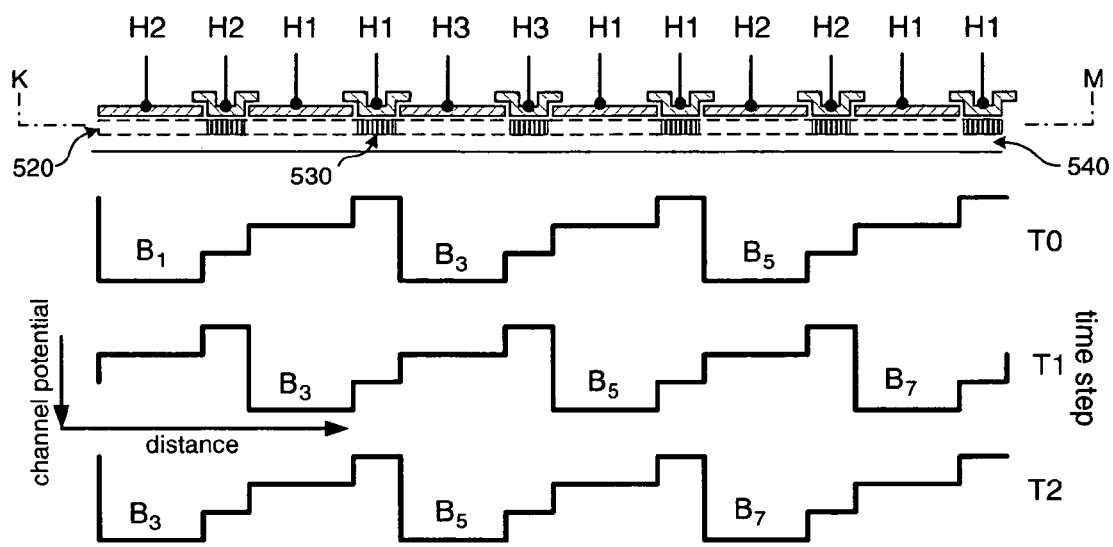
FIG. 27 is a side view of cross section K-M of FIG. 24 including the channel potential diagrams illustrating the time steps sequence of charge transfer for full horizontal resolution readout.
Figure 28:
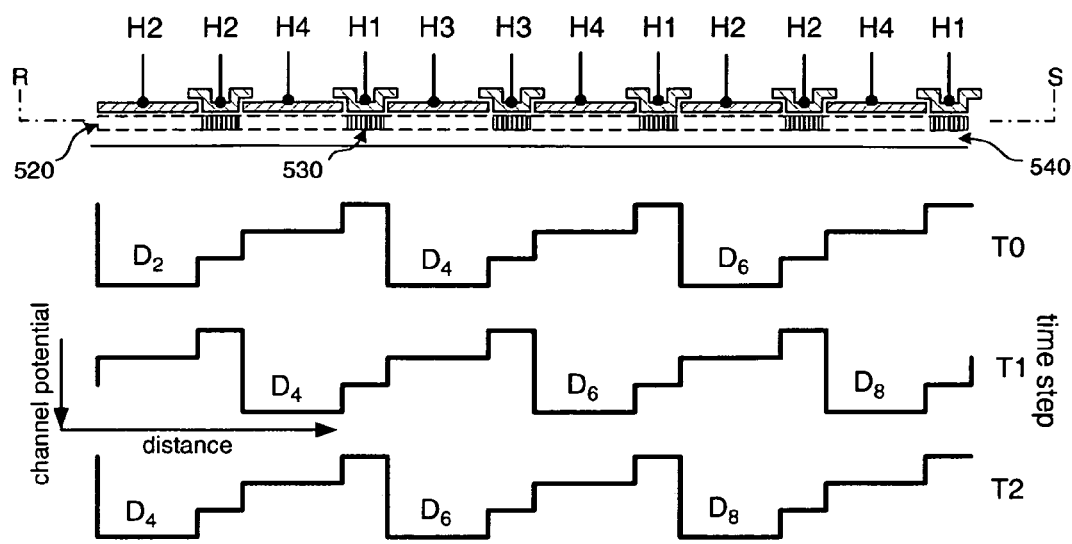
FIG. 28 is a side view of cross section R-S of FIG. 24 including the channel potential diagrams illustrating the time steps sequence of charge transfer for full horizontal resolution readout.

The following discusses the readout of the HCCD in full resolution mode for still photography. FIG. 27 shows the charge transfer sequence for the first HCCD 400 and FIG. 28 shows the charge transfer sequence for the second HCCD 410. A letter corresponding to the color of the charge packet, A, B, C, or D, identifies the charge packets. The subscript on the charge packet label corresponds to the column number of the charge packet. The clock voltages for each time step are shown in FIG. 25 at time steps T0, T1, and T2. The HCCD is clocked as a pseudo 2-phase CCD between two voltages H and L. The transfer gate TG is held in the off state (L) to prevent mixing of charge between the two HCCDs.

Figure 26:
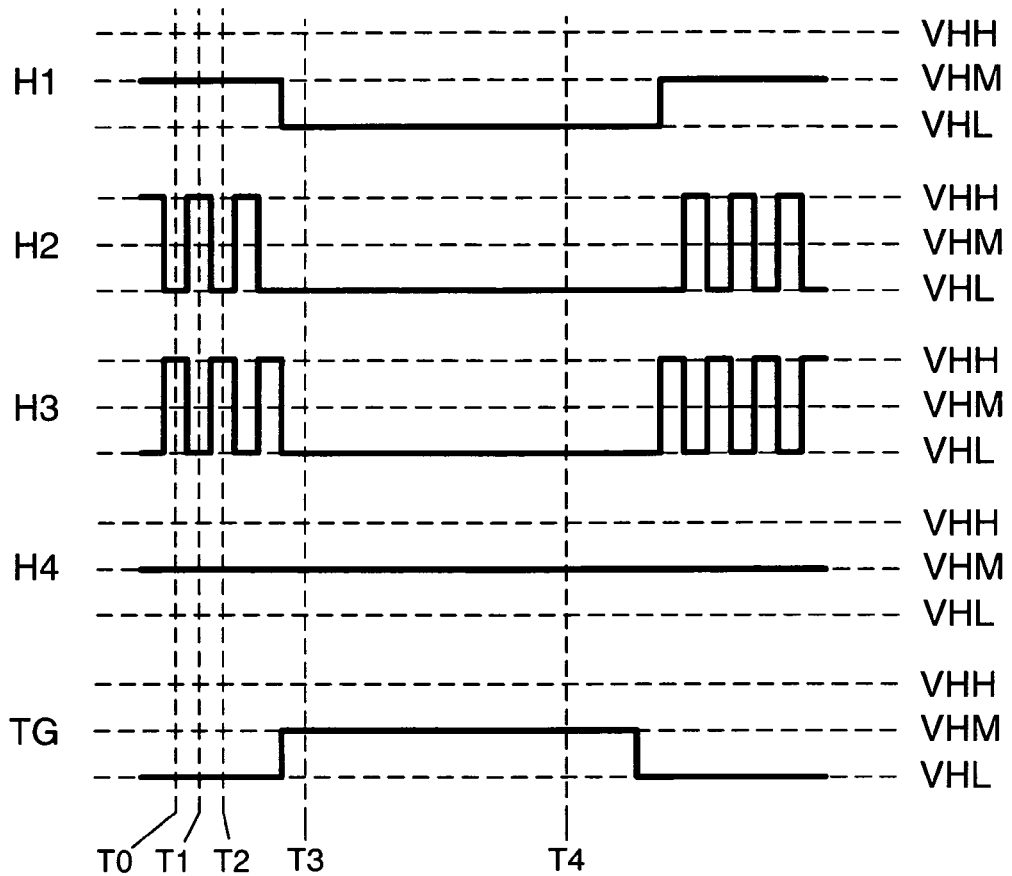
FIG. 26 is a timing diagram for horizontal double speed half resolution readout of the HCCD of FIG. 24 and FIG. 20.
Figure 29:
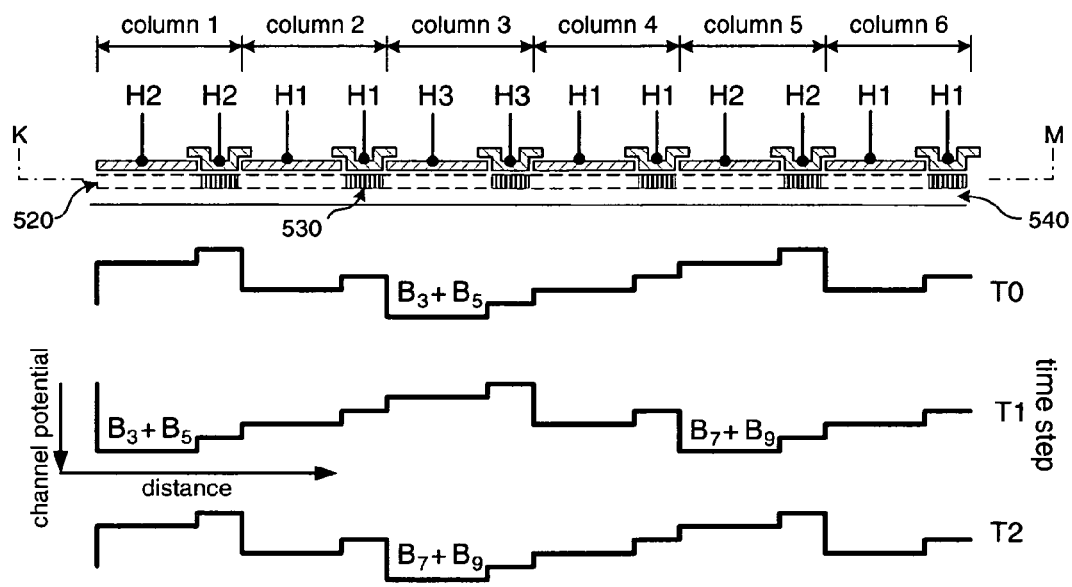
FIG. 29 is a side view of cross section K-M of FIG. 24 including the channel potential diagrams illustrating the time steps sequence of charge transfer for double speed half horizontal resolution readout.
Figure 30:
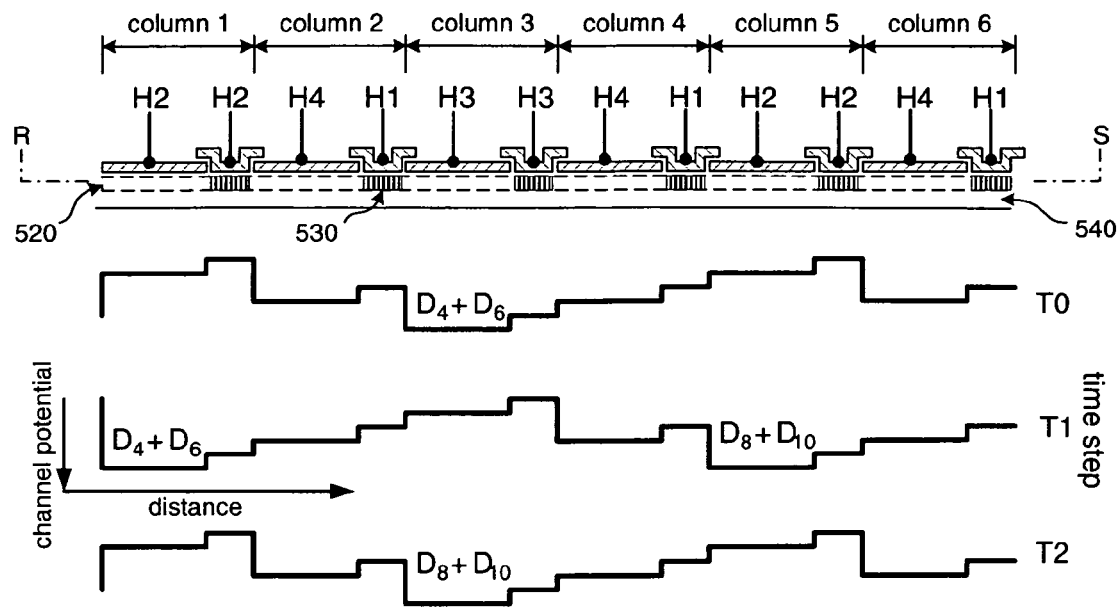
FIG. 30 is a side view of cross section R-S of FIG. 24 including the channel potential diagrams illustrating the time steps sequence of charge transfer for double speed half horizontal resolution readout.

In video mode, two charge packets are summed together as shown in FIG. 29 for the first HCCD 400 and FIG. 30 for the second HCCD 410. Notice that the first HCCD 400 only contains charge packets from pixels of color B and the second HCCD 410 only contains charge packets from pixels of color D. FIG. 26 shows the gate voltage clocking sequence. Time steps T0, T1, and T2 of FIG. 26 correspond to the times steps illustrated in FIGS. 29 and 30. Gates H1 and H4 are held constant at a voltage approximately halfway between H and L. The voltages H and L in video mode do not have to be equal to the voltages used for full resolution still photography. Only gates H2 and H3 are clocked in a complimentary manner. As can be seen in FIG. 29, one clock cycle advances the charge packets by four columns in the HCCD. This is what provides the factor of two-speed increase per HCCD in video mode. As used herein, this video mode clocking of the HCCD is referred to as double speed half resolution clocking in the claims.

Due to the large number of photodiode charges being summed together there is the possibility of too much charge in the VCCD or HCCD causing blooming. The VCCD and HCCD can easily be overfilled. It is widely known that the amount of charge in a vertical overflow drain type photodiode is regulated by a voltage applied to the image sensor substrate. This voltage is simply adjusted to reduce the photodiode charge capacity to a level to prevent overfilling the VCCD or HCCD. This is the exact same procedure normally used even without summing together pixels.

Figure 31:
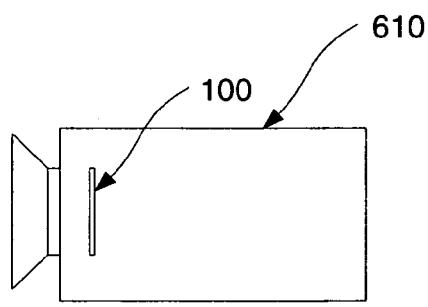
FIG. 31 is a camera illustrating a typical commercial embodiment for the image sensor of the present invention.

FIG. 31 shows an electronic camera 610 containing the image sensor 100 capable of video and high-resolution still photography as described earlier.

The VCCD charge capacity is controlled by the amplitude of the VCCD gate clock voltages. Since the invention sums charges in the HCCD the VCCD does not have to contain full charge packets in order to produce a full signal at the output amplifiers. If the HCCD will sum together two charge packets then VCCD charge capacity can be reduced by a factor of two by lowering the amplitude of the VCCD clock voltages. The advantage of lowing the VCCD clock voltages is reduced power consumption in video mode. The power consumption varies as the voltage squared. Thus a camera would increase the VCCD clock voltages if the camera is operating in still photography mode, or decrease the VCCD clock voltages if the camera is operating in video mode.

The invention has been described with reference to a preferred embodiment. However, it will be appreciated that variations and modifications can be effected by a person of ordinary skill in the art without departing from the scope of the invention.

Parts List 10 charge-coupled device (CCD) image sensor
20 photodiodes
30 vertical CCD (VCCD)
40 horizontal CCD (HCCD)
50 output amplifier
100 image sensor
120 photodiodes
130 vertical CCD (VCCD)
132 control gate electrode
134 control gate electrode
380 channel potential implant adjustment
400 first horizontal CCD (HCCD)
410 second horizontal CCD (HCCD)
420 vertical CCD (VCCD)
430 photodiodes
440 output amplifier
450 output amplifier
460 transfer channel/gate
520 n-type buried channel CCD
530 p-type channel potential adjustment barrier implants
540 p-type well or substrate
610 electronic camera

The invention claimed is:

1. A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method comprising:
   (a) sequentially or substantially simultaneously reading out sets of three lines 1, 3 and 5 into the vertical shift registers, wherein the charges read out to a respective vertical shift register from a corresponding set of three lines 1, 3, and 5 represent one of the at least two colors in the corresponding set of three lines 1, 3, and 5;
   (b) summing the charge in each set of three lines 1, 3 and 5;
   (c) sequentially or substantially simultaneously reading out sets of two lines 2 and 4 into the vertical shift registers, wherein the charges read out to a respective vertical shift register from a corresponding set of two lines 2 and 4 represent one of the at least two colors in the corresponding set of two lines 2 and 4;
   (d) summing the charge in each set of two lines 2 and 4;
   (e) transferring one or more rows of the summed charge into a first horizontal charge-coupled device;
   (f) transferring alternate charges in the first horizontal charge-coupled device into a second horizontal charge-coupled device;
   (g) summing sets of two charges of the same color in the first horizontal charge-coupled device by transferring charges within the first horizontal charge-coupled device;
   (h) summing sets of two charges of the same color in the second horizontal charge-coupled device by transferring charges within the second horizontal charge-coupled device; and
   (i) reading out the charge in both the first and second horizontal shift register with a double speed half-resolution clocking sequence.

2. The method as in claim 1 further comprising the steps of repeating steps (e) through (i) for reading out all of the summed charges.

3. A camera comprising:
   (a) an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions;

(b) a transfer device for sequentially or substantially simultaneously reading out sets of three lines 1, 3 and 5 into the vertical shift registers such that the charges read out to a respective vertical shift register from a corresponding set of three lines 1, 3, and 5 represent one of the at least two colors in the corresponding set of three lines 1, 3, and 5; wherein the vertical shift registers sum the charge in each set of three lines 1, 3, and 5;

(c) a transfer device for sequentially or substantially simultaneously reading out sets of two lines 2 and 4 into the vertical shift registers such that the charges read out to a respective vertical shift register from a corresponding set of two lines 2 and 4 represent one of the at least two colors in the corresponding set of two lines 2 and 4; wherein the vertical shift registers sum the charge in each set of two lines 2 and 4;

(d) a first horizontal charge-coupled device that receives one or more rows of the summed charge; and (e) a second horizontal charge-coupled device that receives alternate charges from the first horizontal charge-coupled device;

wherein the first horizontal charge-coupled device sums sets of two charges of the same color in the first horizontal charge-coupled device which summed charges are read out with a half-resolution clocking sequence; and wherein the second horizontal charge-coupled device sums sets of two charges of the same color in the second horizontal charge-coupled device which summed charges are read out with a double speed half-resolution clocking sequence.

4. The camera as in claim 3, wherein all of the summed charges are read out.

5. A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method comprising:

(a) sequentially or substantially simultaneously reading out sets of two lines 1 and 5 into the vertical shift registers, wherein the charges read out to a respective vertical shift register from a corresponding set of two lines 1 and 5 represent one of the at least two colors in the corresponding set of two lines 1 and 5;

(b) summing the charge in each set of two lines 1 and 5;

(c) sequentially or substantially simultaneously reading out sets of two lines 2 and 4 into the vertical shift registers, wherein the charges read out to a respective vertical shift register from a corresponding set of two lines 2 and 4 represent one of the at least two colors in the corresponding set of two lines 2 and 4;

(d) summing the charge in each set of two lines 2 and 4;

(e) transferring one or more rows of the summed charge into a first horizontal charge-coupled device;

(f) transferring alternate charges in the first horizontal charge-coupled device into a second horizontal charge-coupled device;

(g) summing sets of two charges of the same color in the first horizontal charge-coupled device by transferring charges within the first horizontal charge-coupled device;

(h) summing sets of two charges of the same color in the second horizontal charge-coupled device by transferring charges within the second horizontal charge-coupled device; and (i) reading out the charge in both the first and second horizontal shift register with a double speed half-resolution clocking sequence.

6. The method as in claim 5 further comprising the steps of repeating steps (e) through (i) for reading out all of the summed charges.

7. A camera comprising:

(a) an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions;

(b) a transfer device for sequentially or substantially simultaneously reading out sets of two lines 1 and 5 into the vertical shift registers such that the charges read out to a respective vertical shift register from a corresponding set of two lines 1 and 5 represent one of the at least two colors in the corresponding set of two lines 1 and 5; wherein the vertical shift registers sum the charge in each set of two lines 1 and 5;

(c) a transfer device for sequentially or substantially simultaneously reading out sets of two lines 2 and 4 into the vertical shift registers such that the charges read out to a respective vertical shift register from a corresponding set of two lines 2 and 4 represent one of the at least two colors in the corresponding set of two lines 2 and 4; wherein the vertical shift registers sum the charge in each set of two lines 2 and 4;

(d) a first horizontal charge-coupled device that receives one or more rows of the summed charge; and (e) a second horizontal charge-coupled device that receives alternate charges from the first horizontal charge-coupled device;

wherein the first horizontal charge-coupled device sums sets of two charges of the same color in the first horizontal charge-coupled device which summed charges are read out with a half-resolution clocking sequence; and wherein the second horizontal charge-coupled device sums sets of two charges of the same color in the second horizontal charge-coupled device which summed charges are read out with a double speed half-resolution clocking sequence.

8. The camera as in claim 7, wherein all of the summed charges are read out.

9. A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method comprising:

(a) substantially simultaneously reading out sets of two lines 4 and 5 into the vertical shift register;

(b) transferring the charge from each set of two lines 4 and 5 to align with a respective set of two lines 2 and 3, wherein each set of aligned lines 2 and 4 contains one color and each set of aligned lines 3 and 5 contains one color;

(c) substantially simultaneously reading out each set of two lines 2 and 3 into the vertical shift registers and summing with the charge from a respective set of two lines 4 and 5;

(d) transferring one row of the summed charge into a first horizontal charge-coupled device;

(e) transferring alternate charges in the first horizontal charge-coupled device into a second horizontal charge-coupled device;

(f) summing sets of two charges of the same color in the first horizontal charge-coupled device by transferring charges within the first horizontal charge-coupled device;

(g) summing sets of two charges of the same color in the second horizontal charge-coupled device by transferring charges within the second horizontal charge-coupled device; and (h) reading out the charge in both the first and second horizontal shift register with a double speed half-resolution clocking sequence.

10. The method as in claim 9 further comprising the steps of repeating steps (d) through (h) for reading out all of the summed charges.

11. A camera comprising:

(a) an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions;

(b) a transfer device for substantially simultaneously reading out sets of two lines 4 and 5 into the vertical shift registers, wherein the vertical shift register transfers the charge from each set of two lines 4 and 5 to align with a respective set of two lines 2 and 3, wherein each set of aligned lines 2 and 4 contain one color and each set of aligned lines 3 and 5 contain one color;

(c) a transfer device for reading out each set of two lines 2 and 3 into the vertical shift registers and summing with the charge from a respective set of two lines 4 and 5;

(d) a first horizontal charge-coupled device that receives one row of the summed charge; and (e) a second horizontal charge-coupled device that receives alternate charges from the first horizontal charge-coupled device;

wherein the first horizontal charge-coupled device sums sets of two charges of the same color in the first horizontal charge-coupled device which summed charges are read out with a half-resolution clocking sequence; and wherein the second horizontal charge-coupled device sums sets of two charges of the same color in the second horizontal charge-coupled device which summed charges are read out with a double speed half-resolution clocking sequence.

12. The camera as in claim 11, wherein all of the summed charges are read out.

13. A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method comprising:

(a) sequentially or substantially simultaneously reading out sets of three lines 1, 3 and 5 into the vertical shift registers, wherein the charges read out to a respective vertical shift register from a corresponding set of three lines 1, 3, and 5 represent one of the at least two colors in the corresponding set of three lines 1, 3, and 5;

(b) summing the charge in each set of three lines 1, 3 and 5;

(c) transferring one row of the summed charge into a first horizontal charge-coupled device;

(d) transferring alternate charges in the first horizontal charge-coupled device into a second horizontal charge-coupled device;

(e) summing sets of two charges of the same color in the first horizontal charge-coupled device by transferring charges within the first horizontal charge-coupled device;

(f) summing sets of two charges of the same color in the second horizontal charge-coupled device by transferring charges within the second horizontal charge-coupled device; and (g) reading out the charge in both the first and second horizontal shift register with a double speed half-resolution clocking sequence.

14. The method as in claim 13 further comprising the steps of repeating steps (c) through (g) for reading out all of the summed charges.

15. A camera comprising:

(a) an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions;

(b) a transfer device for sequentially or substantially simultaneously reading out sets of three lines 1, 3 and 5 into the vertical shift registers such that the charges read out to a respective vertical shift register from a corresponding set of three lines 1, 3 and 5 represent one of the at least two colors in the corresponding set of three lines 1, 3 and 5; wherein the vertical shift registers sum the charge in each set of three lines 1, 3 and 5;

(c) a first horizontal charge-coupled device that receives one row of the summed charge; and (d) a second horizontal charge-coupled device that receives alternate charges from the first horizontal charge-coupled device;

wherein the first horizontal charge-coupled device sums sets of two charges of the same color in the first horizontal charge-coupled device which summed charges are read out with a half-resolution clocking sequence; and wherein the second horizontal charge-coupled device sums sets of two charges of the same color in the second horizontal charge-coupled device which summed charges are read out with a double speed half-resolution clocking sequence.

16. The camera as in claim 15, wherein all of the summed charges are read out.

17. A method for reading out charge from an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions, the method comprising:
   (a) sequentially or substantially simultaneously reading out sets of two lines 1 and 5 into the vertical shift registers, wherein the charges read out to a respective vertical shift register from a corresponding set of two lines 1 and 5 represent one of the at least two colors in the corresponding set of two lines 1 and 5;
   (b) summing the charge in each set of two lines 1 and 5;
   (c) transferring one row of the summed charge into a first horizontal charge-coupled device;
   (d) transferring alternate charges in the first horizontal charge-coupled device into a second horizontal charge-coupled device;
   (e) summing sets of two charges of the same color in the first horizontal charge-coupled device by transferring charges within the first horizontal charge-coupled device;
   (f) summing sets of two charges of the same color in the second horizontal charge-coupled device by transferring charges within the second horizontal charge-coupled device; and
   (g) reading out the charge in both the first and second horizontal shift register with a double speed half-resolution clocking sequence.

18. The method as in claim 17 further comprising the steps of repeating steps (c) through (g) for reading out all of the summed charges.

19. A camera comprising:
   (a) an interlined CCD having a plurality of photo-sensing regions and a plurality of vertical shift registers, and each photosensitive region is mated respectively to a CCD of a vertical shift register and a color filter having a repeating pattern of two rows in which each row includes at least two colors that forms a plurality of 5 line sub-arrays sequentially numbered in the space domain; and the color filter spanning the photo-sensing regions;
   (b) a transfer device for sequentially or substantially simultaneously reading out sets of two lines 1 and 5 into the vertical shift registers such that the charges read out to a respective vertical shift register from a corresponding set of two lines 1 and 5 represent one of the at least two colors in the corresponding set of two lines 1 and 5; wherein the vertical shift registers sum the charge in each set of two lines 1 and 5;
   (c) a first horizontal charge-coupled device that receives one row of the summed charge; and
   (d) a second horizontal charge-coupled device that receives alternate charges from the first horizontal charge-coupled device;
   wherein the first horizontal charge-coupled device sums sets of two charges of the same color in the first horizontal charge-coupled device which summed charges are read out with a half-resolution clocking sequence; and wherein the second horizontal charge-coupled device sums sets of two charges of the same color in the second horizontal charge-coupled device which summed charges are read out with a double speed half-resolution clocking sequence.

20. The camera as in claim 19, wherein all of the summed charges are read out.

\* \* \* \* \*